United States Patent [19]

Suthergreen et al.

[11] Patent Number: 5,351,725
[45] Date of Patent: Oct. 4, 1994

[54] SYSTEM FOR MONITORING FILLS OF LIQUID IN A TANK CONTAINER AND ONGOING LIQUID CONDITION

[75] Inventors: David B. Suthergreen, Stamford, Conn.; Fredrick W. Cotton, Irvington; Richard M. Zingel, Mahopac, both of N.Y.

[73] Assignee: Optimum Applied Systems, Inc., Dobbs Ferry, N.Y.

[21] Appl. No.: 41,485

[22] Filed: Apr. 1, 1993

[51] Int. Cl.⁵ ........................... B65B 1/30; B65B 3/26
[52] U.S. Cl. .......................................... 141/1; 141/83; 141/95; 73/299; 73/301; 340/611
[58] Field of Search ................ 141/1, 83, 95; 73/299, 73/301; 340/611, 614, 618

[56] References Cited

U.S. PATENT DOCUMENTS

| | | | |
|---|---|---|---|
| 1,519,609 | 12/1924 | Field | 73/301 |
| 1,681,504 | 8/1928 | Smithe | 73/301 |
| 2,041,859 | 5/1936 | Pyle | 73/54 |
| 2,613,535 | 10/1952 | Born | 73/299 |
| 2,625,042 | 1/1953 | Binford | 73/299 |
| 2,662,404 | 12/1953 | Sontheimer | 73/299 |
| 2,755,669 | 7/1956 | Beard | 73/439 |
| 3,038,336 | 6/1962 | Peters | 73/299 |
| 3,182,502 | 5/1965 | Mayes | 73/223 |
| 3,373,609 | 3/1968 | Sundby | 73/299 |
| 3,613,456 | 10/1971 | Hopfe | 73/439 |
| 4,006,635 | 2/1977 | Khoi | 73/302 |
| 4,043,193 | 8/1977 | Bailey | 733/302 |
| 4,084,435 | 4/1978 | Weik | 73/299 |
| 4,136,567 | 1/1979 | Rosenblum | 73/299 |
| 4,393,705 | 7/1983 | Eidschun | 73/439 |
| 4,422,327 | 12/1983 | Anderson | 73/302 |
| 4,446,730 | 5/1984 | Smith | 73/302 |
| 4,669,309 | 6/1987 | Cornelius | 73/299 |
| 4,788,648 | 11/1988 | Ferretti et al. | 340/618 |
| 5,060,512 | 10/1991 | Kanashige et al. | 340/614 |

FOREIGN PATENT DOCUMENTS 1156575  10/1963  Fed. Rep. of Germany.

*Primary Examiner*—Ernest G. Cusick
*Assistant Examiner*—Steven O. Douglas
*Attorney, Agent, or Firm*—Leo Zucker

[57] ABSTRACT

A system for continuously monitoring fills of liquid such as fuel oil in a tank, and the condition of the liquid. A dual in-line air bell structure senses fluid pressure at upper and lower locations inside the tank, the locations being spaced a known distance apart from one another in a normal direction relative to the tank. Processing circuitry responsive to the fluid pressures obtained via the air bell structure, determines quantities of liquid contained in the tank at certain times and produces corresponding outputs such as gallons of liquid delivered to the tank at each of a number of delivery times, and total gallons of liquid in the tank as the liquid is consumed. The air bell structure is formed with upper and lower air bell sections joined end-to-end along a common axis. Each of the air bell sections includes at least one aperture in its wall to define a cross-section through the air bell section. Liquid pressures sensed at the defined cross-sections of each of the air bell sections, are communicated by pumped air lines to the processing circuitry. The system can be operated on-site or remotely through a telephone modem. Records of tank liquid levels, delivery amounts, and other important data are stored for later access by the user.

30 Claims, 11 Drawing Sheets

SYSTEM FOR MONITORING FILLS OF LIQUID IN A TANK CONTAINER AND ONGOING LIQUID CONDITION

BACKGROUND OF THE INVENTION

1. Field of the Invention

The present invention relates generally to a system for monitoring fills of liquid in a tank container and ongoing liquid condition, and particularly to a system in which a liquid quantity and other characteristics are continuously monitored and recorded for user access on site or through a remote terminal.

2. Description of the Known Art

Systems that monitor the height or volume of liquid in a storage tank, are known to be presently employed in chemical, industrial and food processing applications.

It is known from, for example, U.S. Pat. No. 4,446,730 (May 8, 1984) that the height of a liquid in a tank can be determined independently of specific gravity, by locating two pressure sensing devices in the tank at different levels. As long as the liquid level exceeds the height of the upper sensing device, the pressure difference between the sensing devices and the location of the devices in the tank, are used to compute the height of the liquid without knowledge of the liquid's specific gravity. See also U.S. Pat. No. 4,699,309 (Jun. 2, 1987), and U.S. Pat. No. 3,038,336 (Jun. 12, 1962).

The vertical separation between the pressure sensing devices must be known precisely and not allowed to deviate to ensure accuracy when computing the liquid height. Minor variations in the effective vertical separation between the sensing devices, from the value assumed in the measurement computations, will introduce significant error in the measurements. Generally, each sensing device is individually positioned inside the tank, with the lower device set a certain distance above the tank floor and the upper device positioned a predetermined vertical distance above the lower device. The mentioned '309 patent shows, in FIG. 3, a pressure sensing probe arrangement in the form of two concentrically arranged tubes with a longer tube inside a shorter tube. A spacer projects from the bottom of the longer tube to establish a known separation from the floor of the tank.

U.S. Pat. No. 4,084,435 (Apr. 18, 1978) shows a system for measuring water level at the bottom of a tank containing gasoline. The system includes two pressure sensing devices in the form of an inner air bell and an outer air bell. The air bells are arranged coaxially about one another in a manner similar to that of the probe arrangement in FIG. 3 of the '309 patent.

Knowledge of the actual quantity and condition of liquid contained in a storage tank at any given time is of course desirable, particularly if the liquid is one that is being consumed in an ongoing manner, e,g., a fuel oil, gasoline, and the like. Storage tanks from which consumable liquids are dispensed to trucks, wagons or other delivery vehicles, must be replenished regularly to ensure that a sufficient supply of the liquid will always be available. Likewise, on site storage tanks from which liquids such as fuel oil are piped to heating plants of industrial, commercial and residential buildings, need to be monitored constantly so that enough oil can be ordered and delivered in time to avoid a heating shut off. It is also important to be able to monitor and to keep accurate records of oil deliveries, including quantity of oil delivered, oil temperature, specific gravity, time of the deliveries and the like.

Tank liquid quantity measuring systems such as those disclosed in the mentioned patents, tend to be relatively expensive for commercial and most residential tank users. Those groups generally use less expensive indicators such as a dip stick having measurement scale markings. The stick is lowered through a fill opening of the tank, while holding the stick vertical until the bottom end of the stick strikes the tank floor. Liquid quantity, i.e., gallonage, is then estimated by using the height of liquid in the tank as measured on the dip stick markings, and a printed conversion table. Use of the dip stick thus requires a person physically to access the fill opening of the tank wherever it may be situated, and lower the stick through the opening while being careful to maintain the stick in vertical alignment at all times. Accuracy of the dip stick method suffers even more if the tank is not aligned horizontally, i.e., the tank is tilted such that the top surface of the liquid is not parallel to the tank floor.

Even when the commercial or residential tank user is aware that a delivery of heating oil is necessary to replenish the tank and an oil delivery is requested, he or she usually has no independent means of verifying the quantity of oil added to the tank by the supplier. If the tank has a capacity of, for example, 5,000 gallons, the exact amount of oil needed to top off the tank can be determined only if the amount of oil in the tank just prior to the delivery is first measured. Unless the tank is completely empty and the owner knows that no more than 5,000 gallons is needed to fill it, the owner must rely on the accuracy and integrity of the supplier's oil pump metering device and the honesty of the supplier's employees. With fuel oil prices fluctuating greatly and business expenses continuing to increase, the tank owner can ill afford not to be without an accurate, reliable and relatively inexpensive arrangement for continuously monitoring the quantity and quality of heating oil contained in the tank at all times.

Residential and commercial building owners who are responsible for maintaining a minimum temperature inside their buildings, often have a need to monitor the condition of the building tanks at various times from remote locations. Such remote monitoring would enable the owner to (1) determine if a fuel oil delivery is necessary so he or she can take steps to effect the delivery as soon as possible, and (2) determine accurately the quantity of fuel oil that was pumped into the tank when the delivery was made, the specific gravity of the delivered oil and its temperature.

SUMMARY OF THE INVENTION

An object of the invention is to provide an accurate, cost effective and reliable system that will measure delivery quantities of liquids to a storage tank, and provide liquid volume data either on site or at a remote location.

Another object of the invention is to enable a building owner responsible for maintaining a minimum quantity of fuel oil in a building tank, to monitor and obtain a record of the state of oil in the tank at any time, either on site or from a remote location.

A further object of the invention is to provide a system for measuring the quantity of liquid in a tank using two pressure sensing devices immersed in the liquid, wherein the sensing devices are arranged to be located precisely inside the tank to ensure measurement accuracy.

Another object of the invention is to provide a system for measuring a liquid quantity in a tank, in which two liquid pressure sensing devices of the system take the form of a dual in-line air bell structure.

A further object of the invention is to provide a dual in-line air bell structure for placement inside a tank to sense liquid pressures at two different vertical levels in the tank, wherein the air bell structure can be installed easily in existing tanks of various sizes and shapes, even with little overhead clearance above the tank.

Another object of the invention is to provide a dual chamber air bell structure, wherein only a single air line is needed to communicate with each air bell chamber, thereby reducing material and installation costs, and realizing a streamlined configuration.

Yet another object of the invention is to provide a system that assures building owners, managers and superintendents of accurate, continuous fuel tank monitoring thus making it easy for them to schedule fuel oil deliveries and to monitor the actual quantity, temperature and specific gravity of oil delivered.

Another object of the invention is to provide a system for monitoring the state of liquid in a tank, including a telephone interface so that an authorized caller is able to receive data from the system and to program the system via a telephone modem from any remote location.

Another object of the invention is to provide a system for measuring the quantity of fuel oil in a tank which, in addition to supplying current data to a local or a remote user, will store oil delivery records showing dates, times, gallonage, specific gravity, and temperatures for all recent deliveries.

A further object of the invention is to provide a system for measuring the number of gallons of a liquid such as fuel oil contained in tanks of various geometries and orientations.

Yet another object of the invention is to provide a system for measuring the number of gallons of a liquid such as fuel oil contained in tanks that are misaligned or tilted.

A further object of the invention is to provide a tank liquid monitoring system that can be operated either on site or remotely by a telephone modem, by non-technical users, building superintendents and owners.

According to the invention, a system for determining a quantity of liquid contained in a tank, comprises air bell means for sensing fluid pressure levels at upper and lower locations inside the tank, wherein the locations are spaced a certain distance apart from one another in a normal direction relative to the tank. Processor means responds to pressure levels obtained via the air bell means at the upper and the lower locations in the tank, and determines a quantity of liquid contained in the tank. Coupling means is connected between the processor means and the air bell means for communicating the fluid pressure levels obtained at the upper and lower locations in the tank to the processor means.

The air bell means includes upper and lower tubular sections joined end-to-end to one another along a common axial direction. The upper tubular section has at least one aperture in its wall to define an upper level cross-section at a position corresponding to the upper location in the tank, and the lower tubular section has at least one aperture in its wall to define a lower level cross-section at a position corresponding to the lower location in the tank. Cap means on the upper and the lower tubular sections communicate fluid pressures developed at the defined cross-sections in each of the tubular sections, to the coupling means.

For a better understanding of the present invention, together with other and further objects, reference is made to the following description taken in conjunction with the accompanying drawing, and the scope of the invention will be pointed out in the appended claims.

BRIEF DESCRIPTION OF THE DRAWING

In the drawing:

FIGS. 8-11 are flow charts explaining the sequence of operations of the present liquid fill and condition monitoring system, wherein FIG. 8 is an overall flow chart of the system operation from the time the system is initially turned on;

FIG. 9 is a flowchart showing details of an initialization step in FIG. 8;

FIG. 10 shows details of an air pump and tank liquid condition processing routine depicted in FIG. 8;

FIG. 11 is a chart representing various steps when the system is in a programming mode of operation.

DETAILED DESCRIPTION OF THE INVENTION

Figure 1:
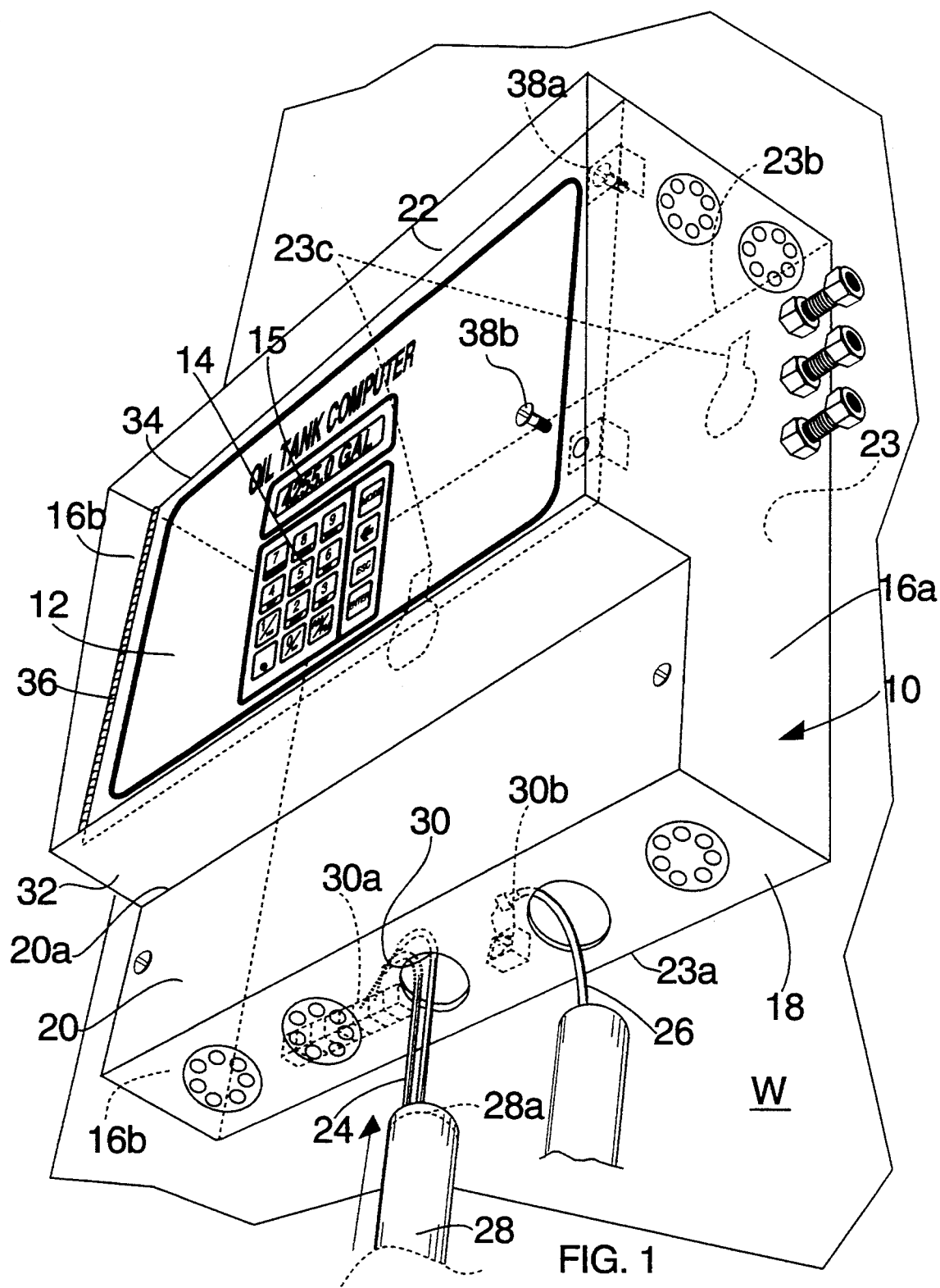
FIG. 1 is a perspective view of a control system housing having a front display panel and key pad for operating the tank liquid quantity measuring system of the present invention.

FIG. 1 is a perspective view of a control system housing 10 having a front display panel 12, a membrane switch key pad 14 on the display panel 12 for operating the present system, and a 16-character illuminated display device 15.

The housing 10 is formed of sturdy sheet metal material such as steel, and includes a pair of side panels 16a, 16b, a bottom apron panel 18, a removable access panel 20, and a top panel 22.

The housing 10 also includes a rear wall 23. The wall can be formed from a sheet metal piece that is bent at bend lines 23a, 23b to form the bottom panel 18 and the top panel 22, respectively. Rear wall 23 has a number of slot openings 23c to facilitate hanging of the entire system housing 10 on hooks (not shown) anchored into a wall surface W.

When removed, the access panel 20 enables a user to connect, for example, power leads 24 from the AC mains and telephone line leads 26 to a connector strip 30a and a telephone jack 30b beneath the access panel 20. Leads 24, 26 are preferably routed to the control system housing 10 from outside the housing through protective conduits. In FIG. 1, an end 28a of conduit 28 from which AC power leads 24 emerge engages an opening 30 in the bottom apron panel 18, and the conduit end 28a is fixed to the housing 10 with suitable fasteners such as locking nuts (not shown). AC leads 24 connect to a terminal block 30a, and separate telephone leads 26 are routed through another opening in housing 10 to a modem jack 30b.

The system housing 10 has a lower lip panel 32 projecting upwardly at right angles next to a long side edge 20a of the access panel 20. Forward edges of the lower lip panel 32, top panel 22 and side panels 16a, 16b define a frame opening 34 within which the front display panel 12 is seated and fixed in place. To allow access to all components within the housing 10 for purposes of adjustment, servicing or replacement, the display panel 12 is hinged by way of a leaf hinge member 36 the leaves of which are fixed to the underside of the display panel 12 and to the inside surface of left side panel 16b. When in a closed position, the display panel 12 is fastened by screws 38a, 38b which engage threaded openings in right-angle members fixed to the inside surface of right side panel 16a, as shown in FIG. 1.

Figure 2:
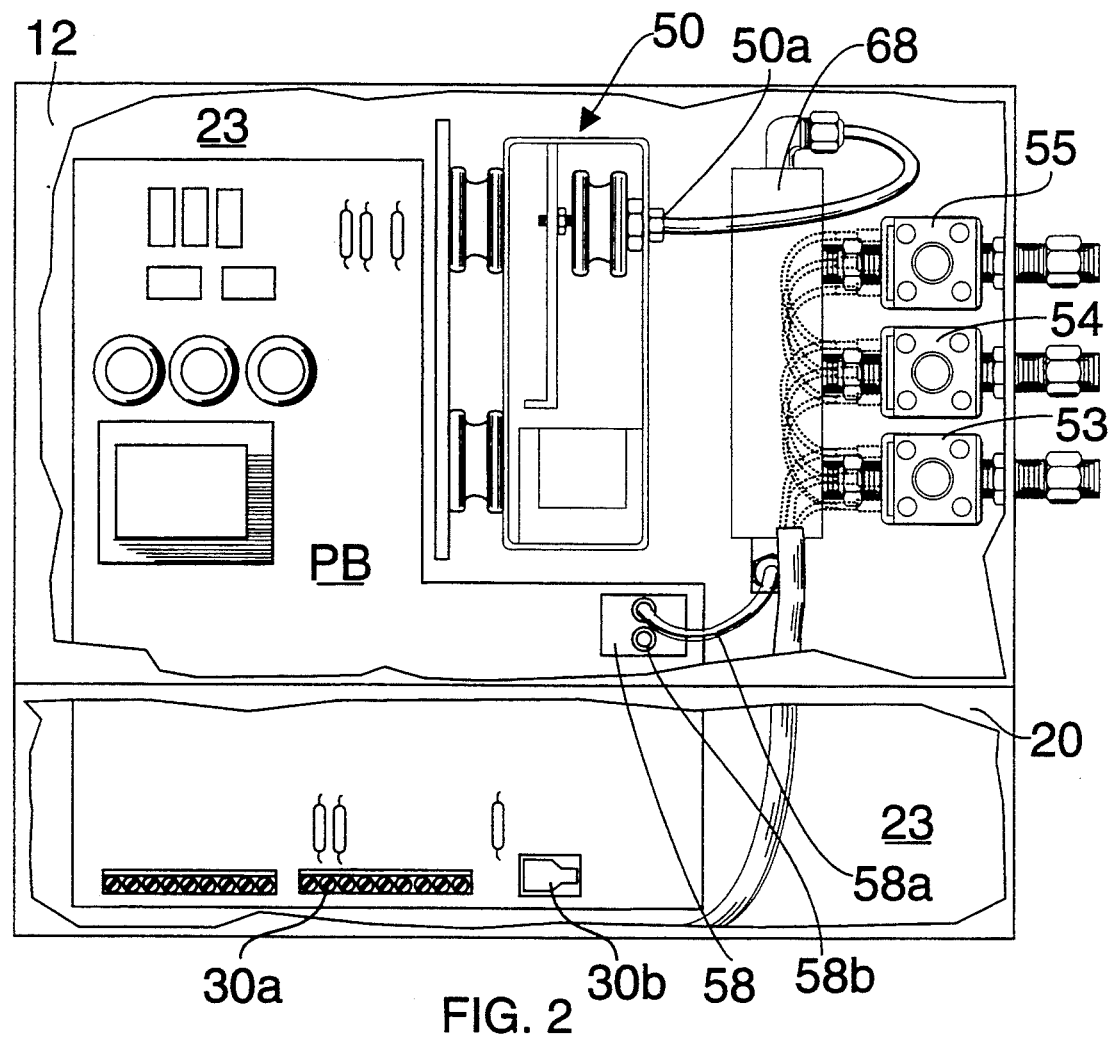
FIG. 2 is an interior view of system components mounted inside the housing in FIG. 1.
Figure 3:
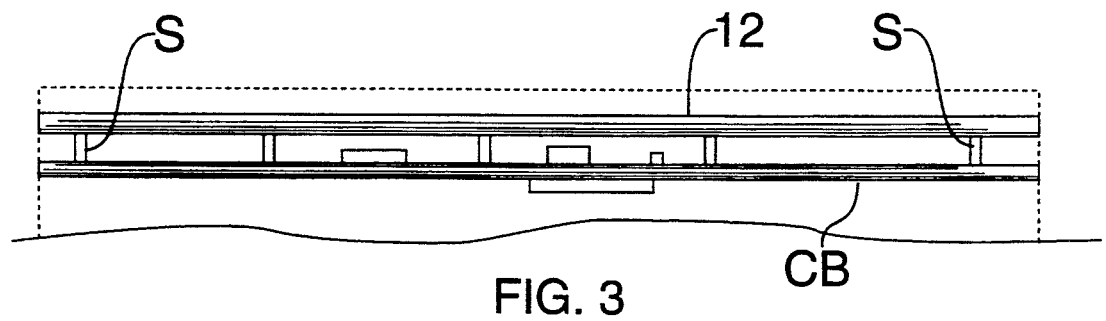
FIG. 3 is a side edge view of the front display panel in FIG. 1 when opened, showing a circuit board mounted beneath the panel.

The construction of the control system housing 10 as described herein is very useful in that it permits all user serviceable components of the system to be accessed simply by removing a pair of screws from the access panel 20, or from the hinged display panel 12. Preferably, a main system control board CB is mounted to standoffs S on the underside of the display panel 12, as shown in FIG. 3. When the panel 12 is opened, the control board CB is fully accessible for servicing. A power supply board PB and other components of the present system described below, are supported on the inside surface of the rear wall 23 as may be seen in FIG. 2.

Figure 4:
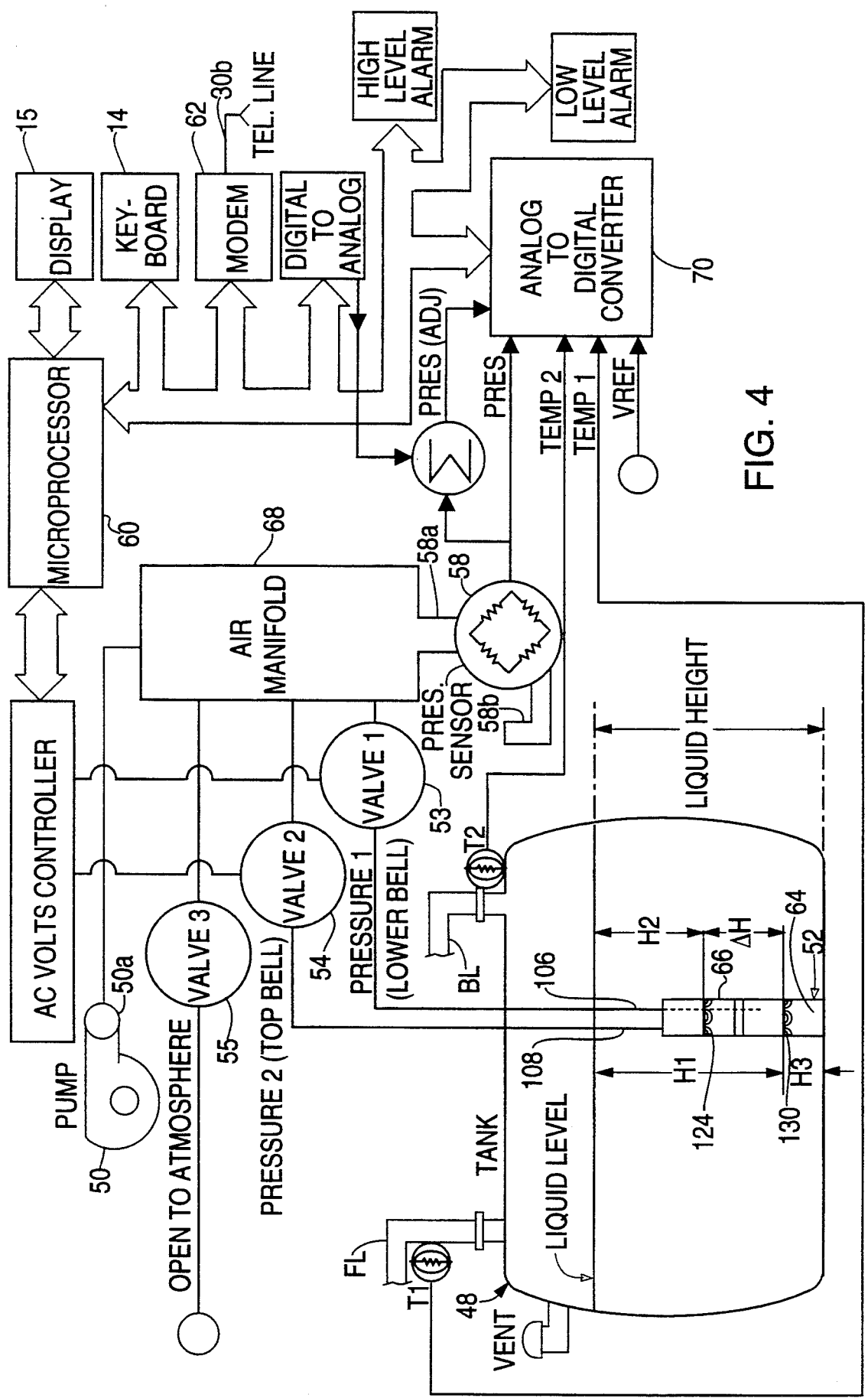
FIG. 4 is a block diagram of the present liquid fill and condition monitoring system.

FIG. 4 is a block diagram of the present tank liquid fill and condition monitoring system.

The present system continuously monitors the quantity and other characteristics of liquid in a tank 48 that is vented to atmospheric pressure. In particular, the system can determine the quantity (gallons), temperature and specific gravity of each oil delivery to a building oil tank and keep records of the deliveries. The system includes an air pump 50, a dual air bell structure 52, fluid valves 53, 54 and 55, a pressure transducer 58, a microprocessor (processor) 60, telephone modem 62, and associated electronics and hardware. Specifically, an Intel type 80C51 microprocessor has been found to perform satisfactorily in the present system. It will be understood that the processor 60 is also coupled to such read only memory (ROM), electronically eraseable programmable read only memory (EEPROM) and random access memory (RAM) circuits (not shown) as are necessary to ensure that the processor 60 can be programmed and carry out all desired operations as described below. Details of the programming for the processor would be apparent to a skilled programmer upon reading the present disclosure.

Each of the valves 53, 54, 55 is connected on an upstream side via a threaded bushing to communicate with a closed interior passage in an air valve manifold 68. See FIG. 2. The valves 53, 54 and 55 are preferably solenoid valves, normally closed, with one-quarter inch NPT ports. Pump outlet 50a and a pressure sensing port 58a of the transducer 58 are also coupled through hosing to corresponding ends of the manifold interior, as shown in FIG. 2. The pressure transducer or sensor 58 has a reference port 58b that is left open to atmospheric pressure inside the system housing 10, so that during system operation the sensor 58 can be self-calibrated in a conventional manner.

Valve 55 opens the transducer 58 to atmospheric pressure for initial self-calibration. Valve 53 opens the transducer to lower air bell section 64, and valve 54 opens the transducer 58 to upper air bell section 66. The manifold 68 therefore places the upstream sides of the valves in communication with the outlet port 50a of the air pump 50, and the input port 58a of the transducer 58.

The pressure transducer 58 converts an air pressure reading obtained when each of valves 53, 54 are selectively opened, into voltages which are input to an analog to digital converter (ADC) 70 for processing by the processor 60. Depending on the results the pressure readings, processor 60 determines which of the following two methods will be used to determine the amount of liquid in the tank 48:

Method 1. Normally used method. Uses air pressure difference obtained via air bells sections 64, 66. Calculations are independent of tank liquid density and temperature.

Method 2. Used only when one of the air bell sections 64, 66 becomes inoperative because the liquid level has dropped too low, or because of hardware failure. Uses air pressure reading obtained via the operating air bell section, a last calculated and stored liquid density.

The present system can perform the following tasks:
1. Verify delivery quantity, time, date, specific gravity and temperature.
2. Enable the user at any time to obtain volume, temperature and specific gravity of the liquid in the tank 48.
3. Notify user of need to call for a delivery (low tank level).
4. Keep a long term record of liquid fuel usage and deliveries.
5. Enable a user to access via telephone modem and PC a historical record including daily usage and reports on prior deliveries.

All current information produced by the system including a last fill amount can be shown on the display device 15 on front panel 12. Current and historical information such as, e.g., the last 40 deliveries and daily usage for, e.g., the last 30 days are retrieved remotely via telephone modem 62. The system alerts the user by telephone at a remote terminal or printer when there is a low level in the tank 48, when a delivery is made, and when vital system failures occur.

Figure 5:
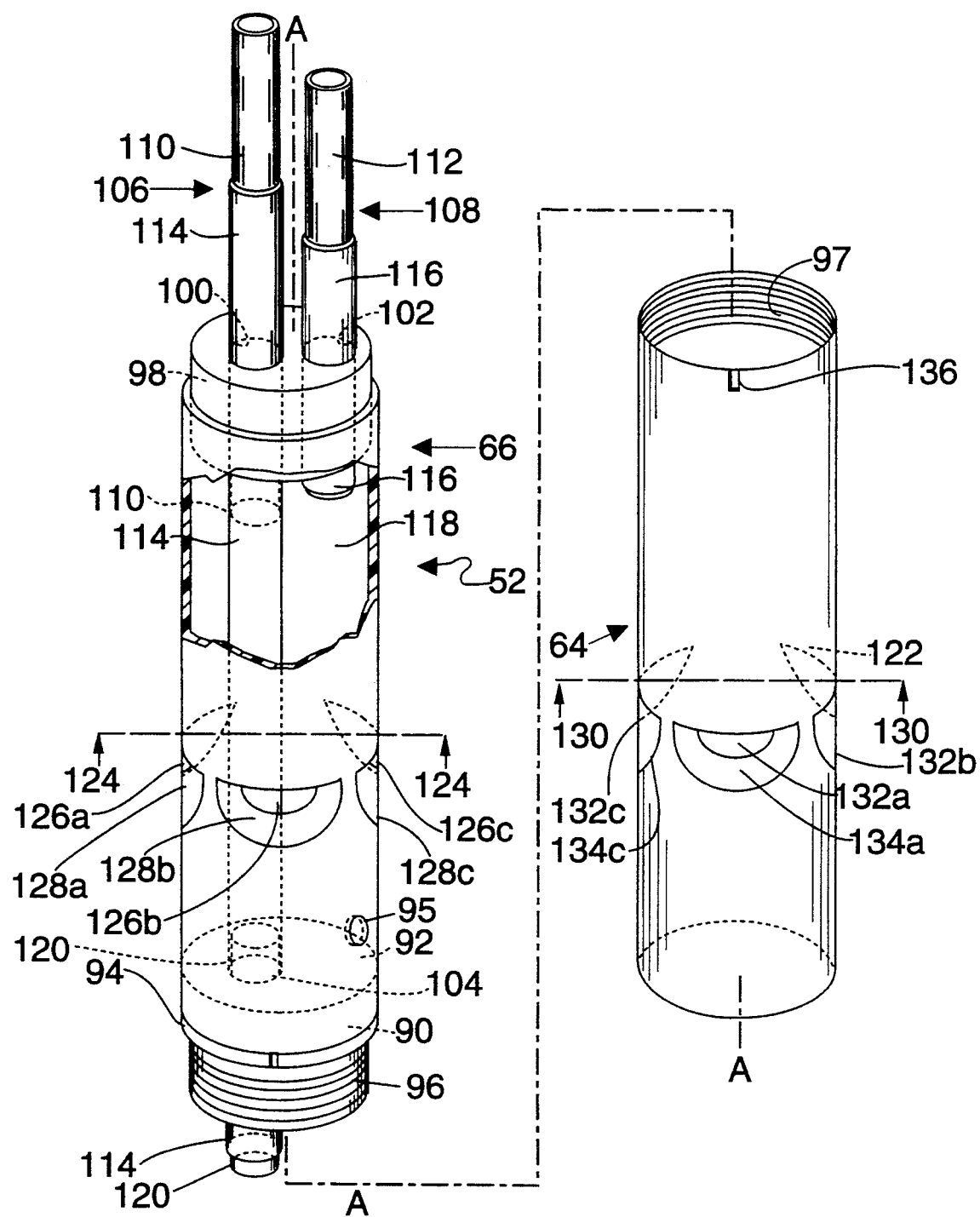
FIG. 5 is a perspective view of a dual in-line air bell structure with parts broken away, including a coupling member between adjoining air bell sections.
Figure 6:
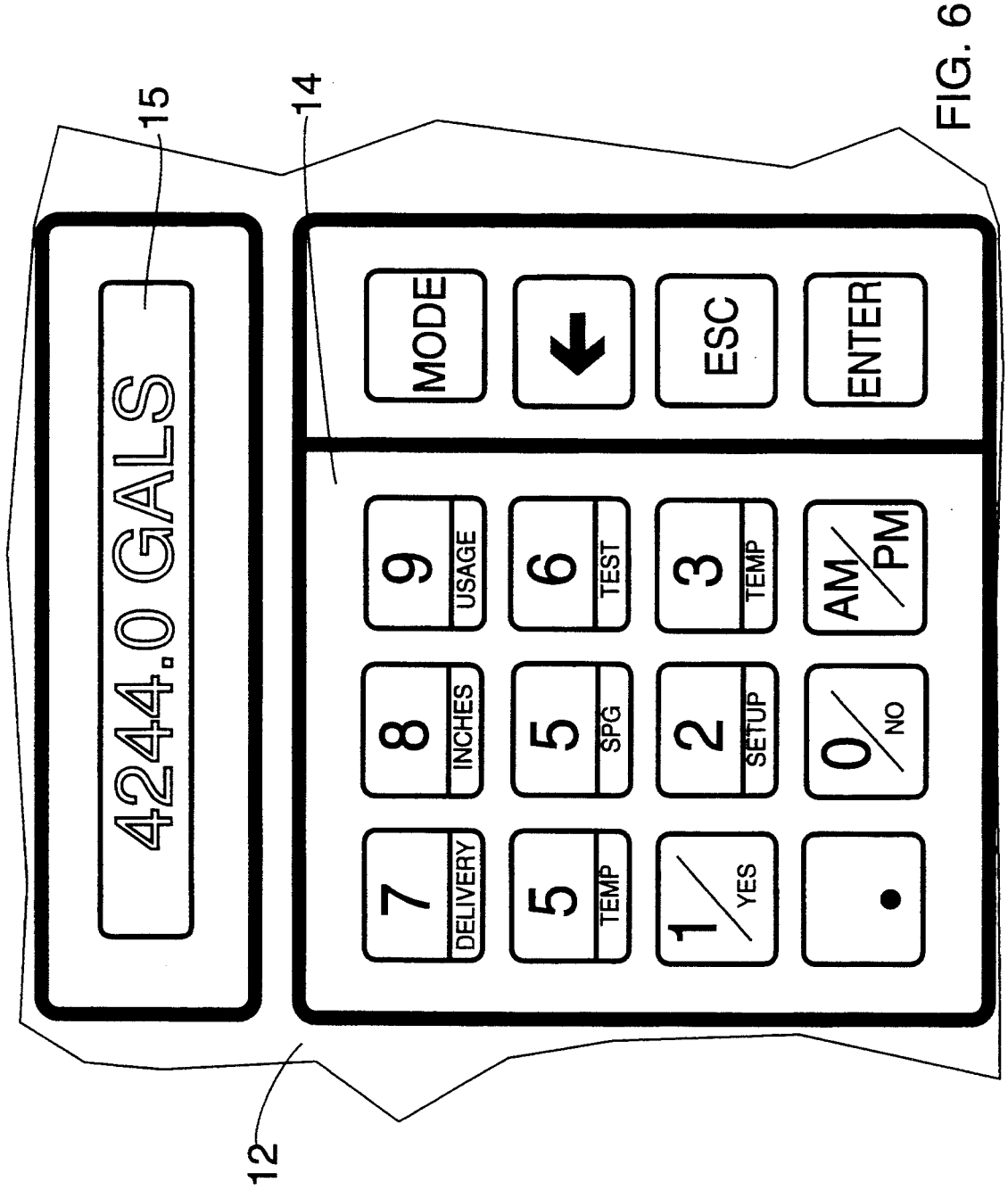
FIG. 6 is an enlarged view of the key pad in FIG. 1.

FIG. 5 is a detailed view of the dual in-line air bell structure 52 according to the invention.

Air bell structure 52 is comprised of lower air bell section 64 and upper air bell section 66. Each of the sections 64, 66 is made of a corrosion resistant cylindrical section of plastics tubing, for example, one-inch I.D. PVC tubing having a ⅛ wall. The tubular sections 64, 66 are joined end to end along a common axis A-A by a coupling member 90 made of a material compatible with the sections 64, 66. Coupling member 90 is in cylindrical form and has an upper cylindrical part 92 which is pressed into the bottom end of the section 66. The upper cylindrical part 92 of the coupling member 90 is adhered to the inside wall of the section 66 with a suitable liquid tight adhesive. A central annular ring 94 protrudes radially from the circumference of the member 90, and the upper side wall of ring 94 abuts the bottom end of the section 66 as shown in FIG. 5. A drain hole 95 is formed in the wall of the air bell section 66 at a location just above the top surface of the upper part 92 of coupling member 90.

In the disclosed embodiment, coupling member 90 also has a lower threaded part 96 that engages corresponding threads 97 in the inside wall of lower air bell section 64, near the top end of the section 64. A non-hardening elastic sealing compound is applied on the threads. Thus, the lower air bell section 64 can be threaded on and off the coupling member 90 in the field, for reasons which will be explained later.

A non-threaded version of the coupling member 90 may also be used if it is not necessary that the air bell structure be disassembled in the field. In such case the lower part of the coupling member 90 has a smooth outer circumference which fits snugly against a smooth inside wall of lower air bell section 64. The lower part is then permanently adhered to the air bell section 64 with conventional PVC cement.

In the working embodiment disclosed herein, both of the lower and the upper air bell sections 64, 66 measure 11.000 inches in length, excluding coupling member 90. Drain hole 95 is drilled through the wall of the upper section 66 with a diameter of 0.184". The center of drain hole 95 is located 11.875" from the bottom end of the lower section 64 after the sections 64, 66 are joined to one another by the coupling member 90.

A top end cap 98 which, like the coupling member 90 can be machined from 1¼" PVC round rod material, is permanently adhered with a liquid tight adhesive in the top end of upper air bell section 66. The top end cap 98 has a first opening 100 with a diameter of 0.390" drilled in the axial direction through the end cap 98. The axis of the opening 100 is offset 0.230" from the center axis A—A of the end cap 98. A second opening 102 is also drilled through the end cap 98 in the axial direction. The opening 102 also has a diameter of 0.390" and is offset from the center axis A—A by 0.230" diametrically opposite the first opening 100.

A third opening 104 is drilled through the coupling member 90 in the direction of axis A—A and offset by 0.230" from the axis so that the third opening 104 can become aligned with the first opening 100 through the top end cap 98, when the coupling member 90 is fixed at the bottom end of the upper air bell section 66.

A lower air line 106 and an upper air line 108 both pass through the openings 100, 102 through the top end cap 98 for purposes of communicating air pressure developed by the pump 50 in FIGS. 2 and 4 to corresponding sections of the dual air bell structure 52. The air lines 106, 108 emerge from the top of the end cap 98 as two lengths of ¼" diameter copper tubing 110, 112 which can be coupled via hoses and suitable hardware (not shown) to the valves 53, 54 inside the control system housing 10 in FIG. 1.

To ensure a tight liquid seal, the copper tubing lengths 110, 112 are sleeved with ⅜" PVC tubing 114, 116 over the lengths of the copper tubing 110, 112 which pass through and project from the bottom of the top end cap 98. Both the copper and the PVC tubing 112, 116 of air line 108 project 0.250" from the bottom of the end cap 98, into an upper air chamber 118 of the upper air bell section 66. The copper tubing length 110 associated with the lower air line 106 also projects 0.250" beneath the bottom of the top end cap 98 but its associated PVC tubing 114 continues to run entirely through the upper air chamber 118 and pass through the third opening 104 in the coupling member 90. The PVC tubing 114 continues to project 0.250" beneath the bottom surface of the coupling member 90. A copper tubing piece 120 is inserted through the bottom end opening of the PVC tubing 114, through the third opening 104 in the coupling member 90 and slightly above the opening 104, so as to ensure a tight seal between the upper air chamber 118 and a lower air chamber 122 of lower air bell section 64. The bottom open end of the tubing piece 120 which terminates the lower air line 106, is thus placed in communication only with the lower air chamber 122 of the lower air bell section 64.

The upper air chamber 118 is bounded by the bottom surface of the top end cap 98, the tubular wall of upper air bell section 66, and an upper level cross section 124 defined by three slit openings 126a, 126b, 126c that are cut in a plane perpendicular to axis A—A and are spaced equally apart from one another in the circumferential direction about the tubular wall of air bell section 66. The slit openings are, e.g., 0.0625" in the axial direction and are cut to a depth of 0.220" in the radial direction through the tubular wall of upper air bell section 66. It has been discovered that clogging of the slit openings 126a, 126b, 126c after the air bell structure 52 is immersed in a liquid filled tank for some time, can be avoided by making bevel cuts 128a, 128b, 128c at about a 45 degree incline through the tubular wall of the air bell section 66 in a plane that extends to the depth of each slit opening. The effect of the beveled cuts 128a, 128b, 128c is to enlarge apertures formed by the slit openings 126a, 126b, 126c in the axial direction downwardly of the upper level cross section 124 defined by the slit openings. Solid particles and other tank residue that might otherwise tend to clog the slit openings when the air bell structure 52 is placed in a liquid filled tank, will be more easily dislodged from the region of the openings through operation of the pump 50 and the action of the passage of air bubbles from the upper air chamber 118 out through the slit openings 126a, 126b, 126c.

The lower air chamber 122 is bounded by the bottom surface of the coupling member 90, the inside wall of the tubular lower air bell section 64, and the lower level cross section 130. The lower level cross section 130 is defined by three equi-circumferentially spaced slit openings 132a, 132b, 132c which are formed to have the same dimensions as the slit openings 126a, 126b, 126c that define the upper level cross section 124. The slit openings 132a–c also have associated beveled cuts 134a–c formed in the same manner as the beveled cuts 128a–c. Beveled cuts 134a–c serve to enlarge the apertures formed by slit openings 132a–c which communicate with the lower air chamber 122. Accordingly, clogging of the lower level slit openings by solid matter mixed with tank liquid in which the air bell structure 52 is immersed, will be significantly reduced if not entirely eliminated.

The portion of the lower air bell section 64 between lower level cross section 130 and the bottom end of the section 64, acts to establish a known height between a tank bottom floor and the lower level cross section 130. In the working embodiment, the height H3 is set precisely at 5.000". The axial distance between the upper level cross section 124 of upper air bell section 66 and the bottom end of lower air bell section 64, is set precisely at 17.000", after the entire air bell structure 52 is assembled. Accordingly, the axial separation between the upper and the lower level cross sections 124, 130 is established precisely at 12.000". As mentioned earlier, it is important that the vertical separation between the points at which liquid pressure is measured in a tank to compute the quantity of liquid in the tank, be known precisely for measurement accuracy.

Because the air bell structure 52 when fully assembled may be too long to install through the tops of existing tanks which have very little overhead clearance, the lower air bell section 64 can be unscrewed from threaded coupling member 90 prior to installation. The lower section 64 is passed by hand through the tank top until its inside threads 97 are at tank top level. The upper section 66 is then screwed via the threaded coupling member 90 into the lower section 64 most of which is already inside the tank.

To ensure that the distance between the upper and the lower cross sections 124, 130 is re-established when the lower section 64 is threaded back onto the coupling member 90 in the field, an indexing notch 136 is formed bridging the circumference of the annular collar 94 on the coupling member 90, and the confronting top end of lower air bell section 64 when the air bell structure 52 is first assembled and the slit openings in the upper and the lower air bell sections are first cut. Accordingly, when the lower air bell section 64 is re-threaded on the coupling member 90 and the portion of notch 136 on the lower section 64 is aligned with the portion of the notch 136 on the collar 94, the pre-set vertical separation between the upper and the lower level cross sections 124, 130 is re-established.

The assembled air bell structure 52 is lowered fully into a tank inside a standard guide pipe until the bottom end of the lower section 64 abuts the tank floor. The guide pipe must be of such a length as not to extend below cross-section 124 of the upper air bell section 66. The axis of the structure 52 is set normal to the tank floor, and the entire structure is fixed in place by means of two compression fittings, one for each of air lines 106, 108. The fittings are screwed into a standard tank fitting on the tank top surface.

Also, it may sometimes be desirable to plug the bottom opening of lower air bell section 64, e.g., to prevent sediment on a tank floor from entering the interior of the section 64 when the air bell structure 52 is fixed in place in a tank. If plugged, a drain hole similar to the hole 95 should also be formed through the wall of the tubular section 64 below the slit openings 132a-c, unobstructed by any bottom plug member.

SYSTEM OPERATION USING METHOD 1

When calculating the quantity or volume of liquid in the tank 48 independently of the liquid's specific gravity and temperature, the tank liquid level must be above the open, upper level cross section 124 in upper air bell section 66 to ensure an accurate measurement.

Once the air bell sections 64, 66 are fully purged with air from pump 50, the air pressure in each bell section is sensed by the selective opening of valves 53, 54 and corresponding readings taken by the pressure transducer 58. Each reading represents the actual tank liquid pressure at an open cross section 124, 130 of the associated air bell section. The purging of the air bell sections and reading of the liquid pressure levels are controlled by the processor 60 which is programmed accordingly.

Assume that the height of liquid in the tank 48 is H1+H3, as shown in FIG. 4. Let H3 be the distance from the open cross section 130 of lower air bell section 64 to the bottom or floor of the tank 48. Let H1 be the distance from the surface of the liquid to the open cross section 130 of air bell section 64. The distance H1 is then calculated according to the following relationship:

$$H1 = \frac{P1 \, \Delta H}{P1 - P2}$$

where
 P1=pressure sensed by air bell section 64
 P2=pressure sensed by air bell section 66
 $\Delta H$=axial distance between cross sections 124, 130 of air bell sections 64, 66.

Once the total height H1+H3 of the liquid has been determined, the processor 60 calculates the amount of liquid in tank 48 using conventionally derived geometric formulas based on the tank's physical characteristics which are called for and entered via the keypad 14 or modem 62 when the system is initialized.

SYSTEM OPERATION USING METHOD 2

When only one of the air bell sections 64, 66 is operative because the level of liquid in the tank has dropped below the open cross-section 124 of upper air bell section 66, or because of a hardware failure, the system will continue to operate by using a last stored calculated value of the specific gravity and a measured liquid temperature obtained via the sensor T2.

Preferably, while both air bell sections 64, 66 are operational, the specific gravity SPG of the liquid is continuously calculated and stored in a memory associated with the processor 60. The liquid's specific gravity can be calculated as follows:

$$SPG = \Delta P/(\rho_w)(g)(\Delta H)$$

where
 $\Delta P$=difference between measured air pressures in air bell sections 64, 66.
 g=gravitational constant.
 $\Delta H$=vertical distance between open cross-sections 124, 130 of air bell sections 64, 66.
 $\rho_w$=density of water at 4 deg. C.

If upper air bell section 66 becomes inoperative, the processor 60 uses a last calculated value of specific gravity stored in memory to calculate the height H1 of tank liquid above the open cross section 130 of lower air bell section 64:

$$H1 = P1/(g)(SPG)(\rho_w)$$

where
 P1=pressure sensed by lower air bell section 64.
 SPG=last calculated specific gravity, temperature adjusted.
 g=gravitational constant.
 $\rho_w$=density of water at 4 deg. C.

The total liquid height H1+H3 is then calculated as before.

In case only the lower air bell section 64 fails, the same method as above is used based instead on pressure readings from operating air bell section 66.

The present system is capable of measuring quantities of liquid and liquid fills into tanks that are misaligned and tilted. For example, when a conventional oil tank is tilted so that its horizontal axis deviates from the true horizontal direction, liquid volume calculations carried out by way of the above formulae may not always produce accurate data. The present system can adjust for such tilt according to the following operations.

Figure 7:
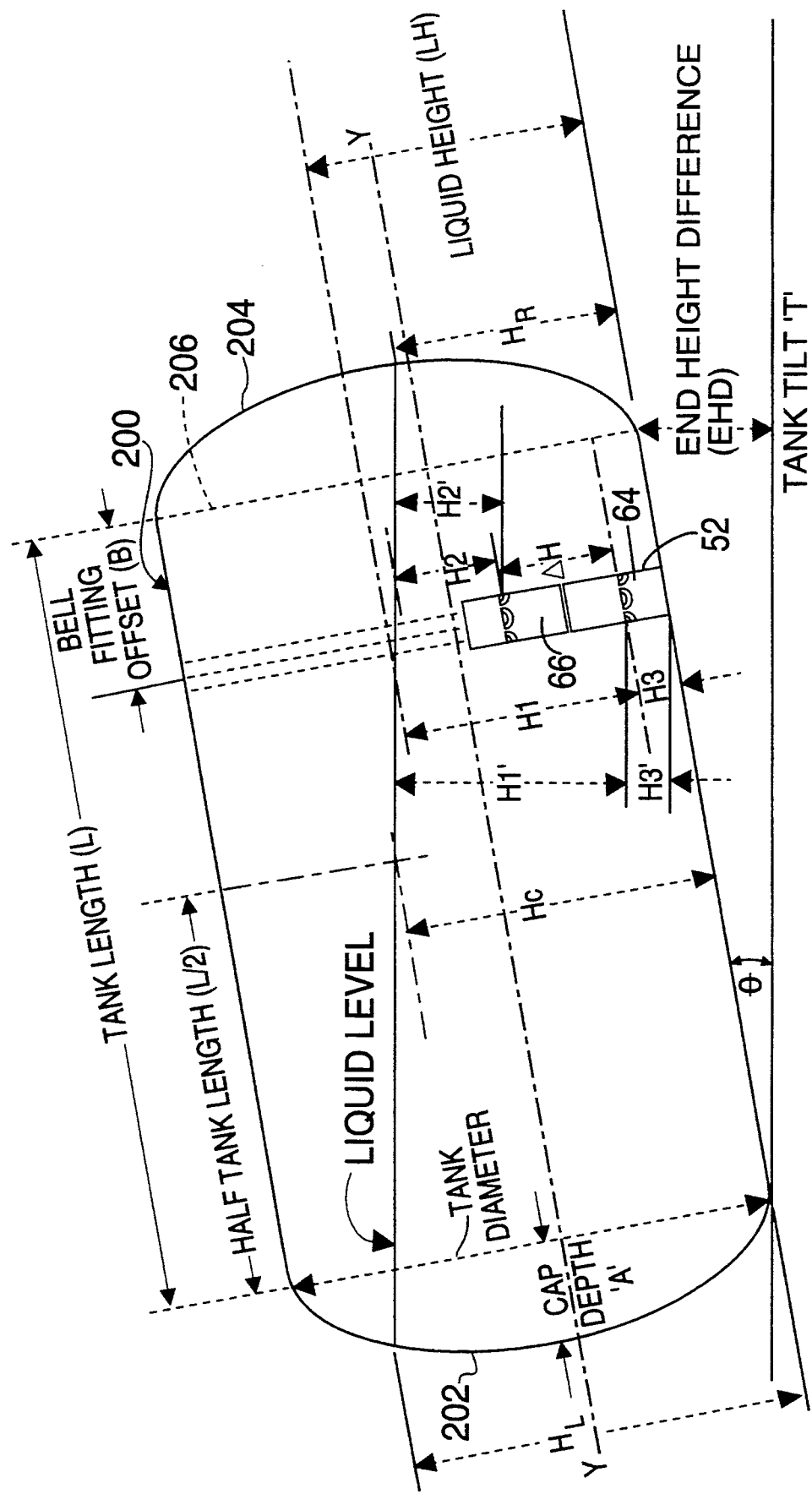
FIG. 7 is a schematic representation of a tilted tank with the present air bell structure installed.

FIG. 7 is a diagram showing a cross-section of a conventional oil tank 200 whose axis Y—Y is offset or tilted with respect to the true horizontal by a known angle $\theta$, as shown. With the tilt condition illustrated in FIG. 7, it will be understood that the liquid level in the tank is not parallel to the tank bottom floor. Rather, the liquid level rises toward the left side of the tank 200 as viewed in FIG. 7 to a maximum height $H_L$ measured in a direction normal to the tank floor along the inside wall of a left-end cap 202 of the tank. The liquid level descends to a height $H_R$ measured in a direction normal to the tank floor along the inside wall of right-end cap 204 of the tank 200. Air bell structure 52 is positioned perpendicular to the tank axis Y—Y, with the axis A—A of the air bell structure 52 offset by a distance B in the axial direction of the tank 200 from a plane 206 through the right-end of the tank 200.

Under the condition that both of the air bell sections 64, 66 are operating, fluid pressure levels sensed by each of the air bell sections 64, 66 will correspond to the height of the liquid along the axis A—A of the air bell structure 52. The liquid height, LH, may be expressed as follows:

$$LH = H1 + H3 = \frac{H1'}{\cos \theta} + H3$$

$$\text{Where } H1' = \frac{(P1)(\Delta H)(\cos\theta)}{P1 - P2}$$

P1=pressure sensed by air bell section 64
P2=pressure sensed by air bell section 66
$\Delta H$=axial distance between cross sections
$\theta$=arcsin (EHD/L), where EHD is the end height difference or vertical rise from the left to the right bottom ends of tank 200 as seen in FIG. 7, and L is the tank length less the end caps. The EHD can be accurately determined on site by use of, e.g., a water level.

Under the condition that air bell section 64 (lower section) is inoperative;

$$LH = H2 + \Delta H + H3$$

$$LH = \frac{H2'}{\cos \theta} + \Delta H + H3$$

Where $H2' = P2/(g)(SPG)(\rho_w)$
g=gravitational constant
$\rho_w$=density of water at 4 deg. C.
SPG=last calculated specific gravity
$\theta$=arcsin (EHD/L)

Should the upper air bell section 66 become inoperative;

$$LH = H1 + H3$$

$$LH = \frac{H1'}{\cos \theta} + H3$$

Where $H1' = P1/(g)(SPG)(\rho_w)$
g=gravitational constant
$\rho_w$=density of water at 4 deg. C.
SPG=last calculated specific gravity
$\theta$=arcsin (EHD/L)

The liquid heights $H_L$ and $H_R$ at the end caps 202, 204 are then computed based on the liquid height LH along the axis of the air bell structure 52, the air bell fitting offset, the tank and end cap dimensions, and the tank tilt angle.

The actual volume of liquid in the tank is determined by averaging two liquid volumes calculated for each of liquid heights $H_L$ and $H_R$ at the tank end caps. The averaging produces a geometrically exact result for symmetric tank geometries. Accordingly, whether calculating liquid volume in a normally oriented tank, i.e., zero tank tilt ($\theta=0$) or in tanks that are tilted, the present system performs two liquid volume calculations based on the liquid height at each tank end cap, and computes the average of the two results to determine the actual liquid volume. In the specific case of zero tank tilt ($\theta=0$), the liquid height LH along the axis of the air bell structure is equal to both $H_L$ and $H_R$ and therefore only one liquid volume calculation is required.

In order to calculate the liquid height at each of the end caps, the geometry of the end caps must first be known. There are three conventional kinds of end caps, namely; flat, spherical and elliptical. The kind of end cap and its dimensions are entered into the system during the initialization process, discussed below. In the case of the flat end caps;

$$H_R = Hc - \frac{L}{2} \tan \theta$$

$$H_L = Hc + \frac{L}{2} \tan \theta$$

$$\text{Where } Hc = LH + \left(\frac{L}{2} - B\right)*(\tan \theta)*(T)$$

L=tank length
B=air bell fitting offset
$\theta$=arcsin (EHD/L)

$T = 1$ if tank tilt is up ($\theta$ is positive)
$= -1$ if tank tilt is down ($\theta$ is negative)

Figure 12A:
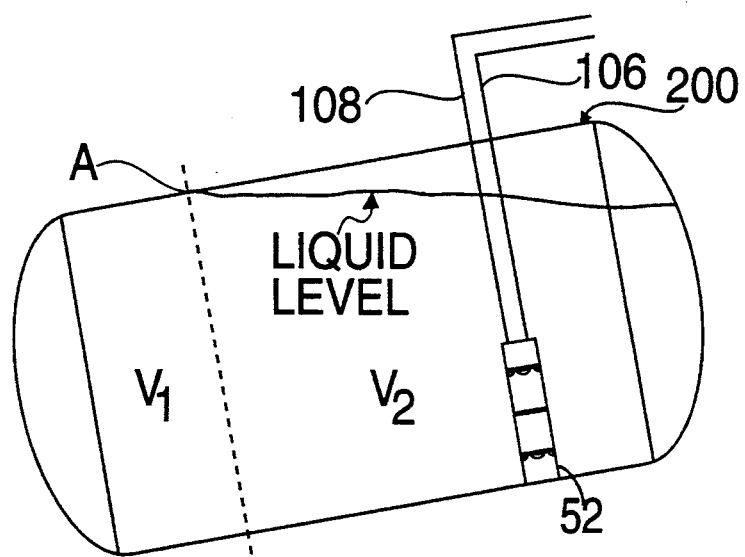
FIGS. 12(a) 12(b) are schematic representations of a tilted tank under certain liquid fill limit conditions.

If the end caps are spherical, the liquid heights $H_R$ and $H_L$ are determined from the roots X of the following equations:

$$\left\{\frac{L}{2} - \frac{1}{\tan \theta}(Hc - R + X) + r - A\right\}^2 + X^2 = r^2$$

roots $X_1, X_2$ $$\left\{\frac{L}{2} - \frac{1}{\tan \theta}(Hc - R + X) + r - A\right\}^2 + X^2 = r^2$$

roots $X_3, X_4$ $h_A$=minimum of $H_L'$ and $H_R''$
$h_B$=maximum of $H_L'$ and $H_R''$
$X_A$=maximum of $X_1, X_2$
$X_B$=minimum of $X_3, X_4$
$h_A = R - X_A$
$h_B = R - X_B$
Where L, $\theta$, Hc are as defined above
r=radius of spherical cap
A=spherical cap depth at the center
R=cylindrical tank radius For elliptical end caps, the equations to be solved are as follows:

$$\frac{1}{A^2}\left\{\frac{L}{2} - \frac{1}{\tan\theta}(Hc - R + X)\right\}^2 + \frac{X^2}{R^2} = 1$$

roots $X_1, X_2$ $$\frac{1}{A^2}\left\{\frac{L}{2} - \frac{1}{\tan\theta}(Hc - R + X)\right\}^2 + \frac{X^2}{R^2} = 1$$

roots $X_3, X_4$ $h_A$ = minimum of $H_L'$ and $H_R''$
$h_B$ = maximum of $H_L'$ and $H_R''$
$X_A$ = maximum of $X_1, X_2$
$X_B$ = minimum of $X_3, X_4$
$h_A = R - X_A$
$h_B = R - X_B$ Where
L, $\theta$, Hc, R, are as defined above
A = elliptical cap depth at the center With titled tanks, it will be understood that the calculated liquid heights $H_L$, $H_R$ at the tank end caps 202, 204 can exceed the tank diameter if the tank is almost or completely full and the end cap is at the lower end of the titled tank. Such a condition is shown in FIG. 12(a). Also, if the tank is nearly empty, the computed liquid height at the higher level end cap may become a negative number if the actual liquid level intersects the tank floor prior to reaching the higher level end cap. Such a condition is shown in FIG. 12(b).

Tank liquid volume computations are then carried out in the following manner for each of the two mentioned conditions with titled tanks.

In the case of FIG. 12(a), a point A of intersection of the tank liquid with the top of the tank is determined. A volume $V_2$ is calculated using the above formulas but assuming that there is only one end cap, and that point A defines the lower end of the tank. The tank volume $V_1$ is determined from A to the lower end of the tank including its end cap, and $V_1$ is added to $V_2$.

Figure 12B:
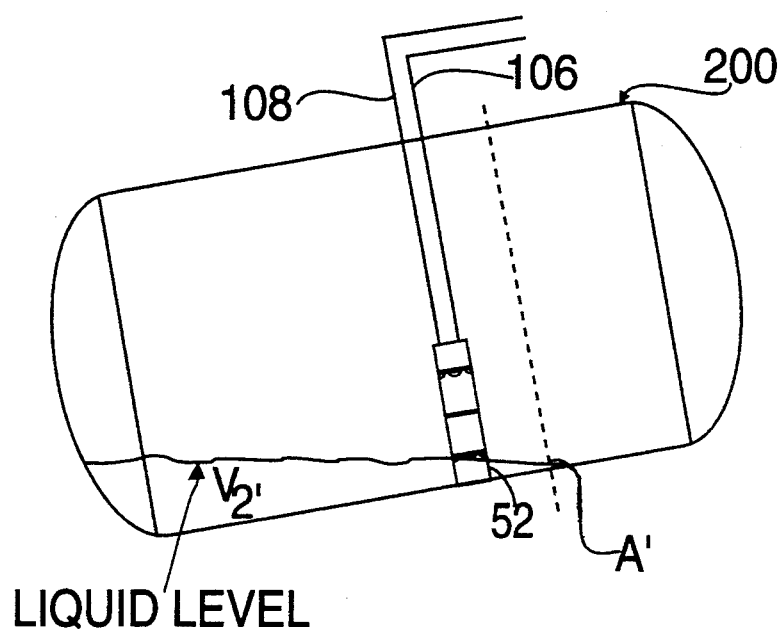

In the case of FIG. 12(b), a point of intersection A' of the liquid level with the bottom of the tank is determined. The liquid volume $V_2'$ including its end cap is then calculated with the above formulas, using point A' as the high end of the tank.

The following is a description of the use and operation of the present system, either via a remote telephone modem or on site by use of the keypad 14 and the display panel 12.

Figure 8:
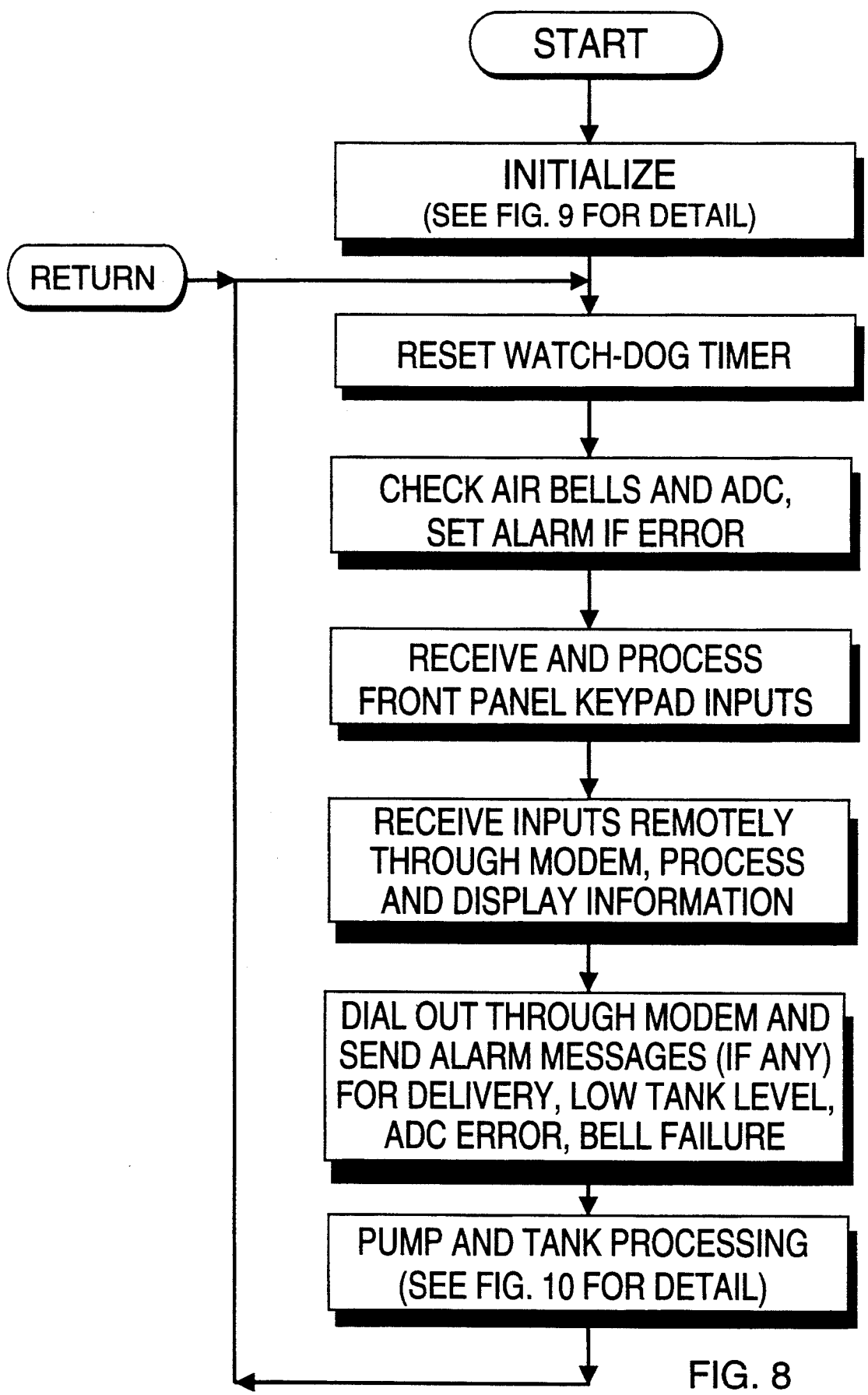
Figure 9:
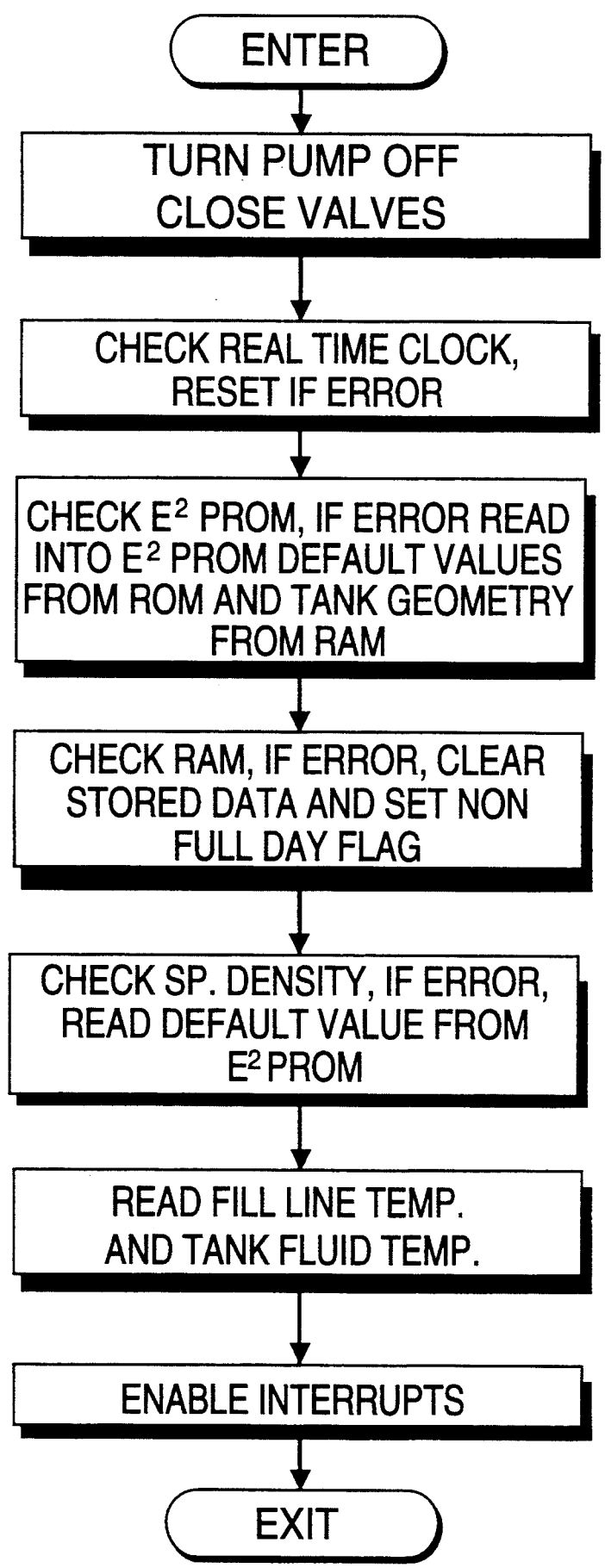
Figure 10:
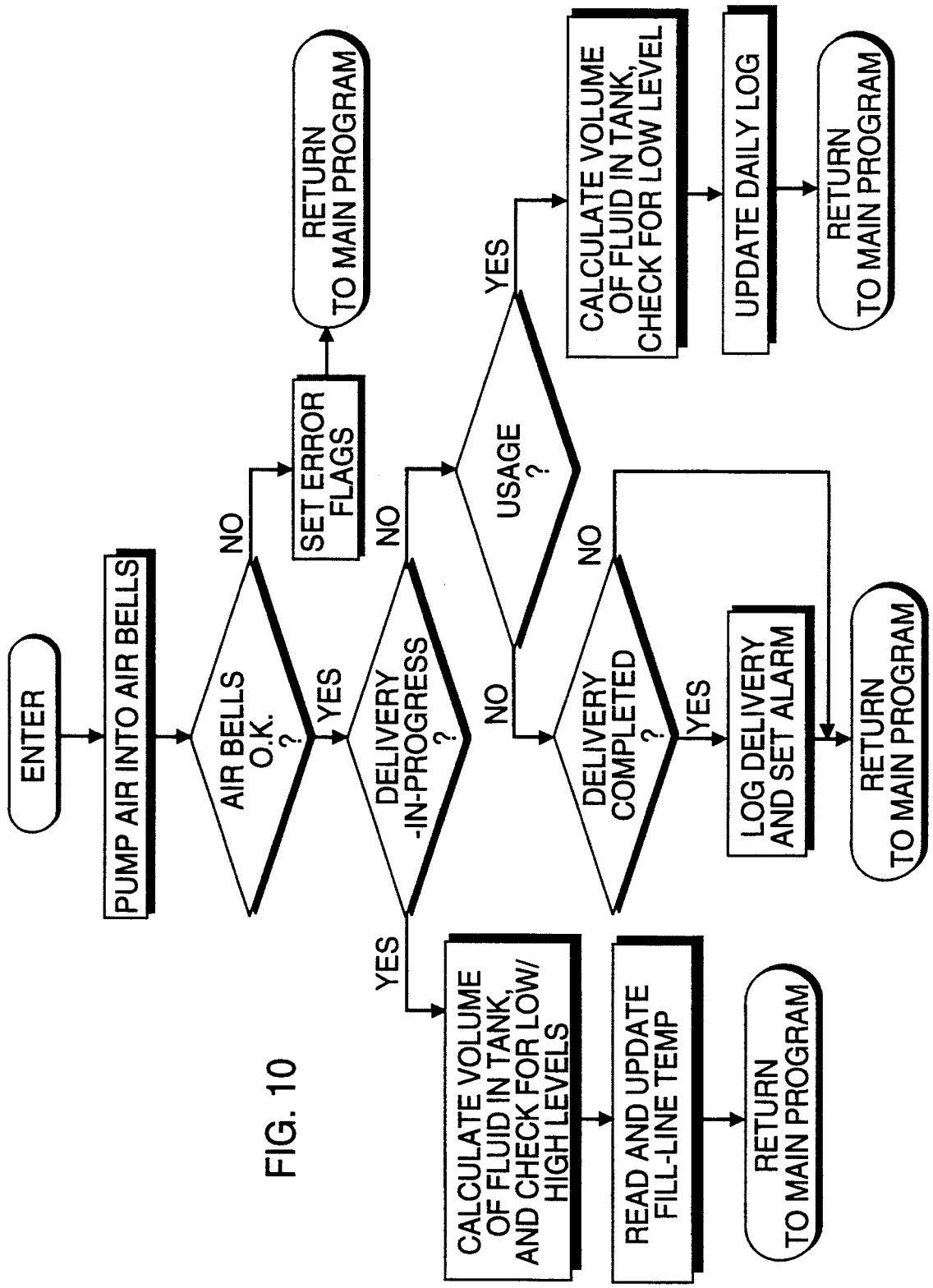

The present system provides building owners, managers and superintendents with accurate and continuous fuel tank monitoring and allows them easy scheduling and monitoring of fuel oil deliveries. The system is equipped with a telephone interface that provides the user with data reporting and programming capability via the telephone modem from any remote location. The telephone interface may also have a dial out capability by which the system calls up to, e.g., four different telephone numbers to report low tank level or other system malfunctions. When the system is installed on site and powered-up it follows an overall operating sequence as depicted in FIG. 8. The initialize step is more fully depicted in FIG. 9, and the pump and tank processing routine is shown in FIG. 10. A programming mode of operation is outlined in FIG. 11.

Either a portable terminal or a personal computer (PC) with a modem can be used to communicate with the present system. Once installed, the system itself has its own telephone number. Before calling, the user should make sure that his/her modem is set to the proper baud rate and parity. The present system will communicate with a remote terminal having a printer or a video monitor. Without limitation, the following are typical required specifications for such remote terminals:

300 or 1200 bps transmission rate;
Even Parity;
10 bit data transmission (7 data bits, 1 start bit, 1 stop bit, 1 parity bit)

When the system is called, it is programmed to pick up the line after one or more rings and to answer with a tone. When the user's terminal or modem acknowledges the tone, the system will immediately respond with a logon message. The message contains the address of the building being called, as well as current date, time and the tank capacity. The user terminal will then display "MODE:" and wait for the first instruction. A typical logon message is:

```
OAS Tank Gauge
145 PALISADE STREET          4:26P Sat Dec 25, 1993
TANK CAPACITY: 5000 GALLONS
```

The value of the tank capacity is actually calculated by the system from tank dimensions entered by the user. When the system transmits "MODE:" to the user's terminal, it is waiting for a command to be entered. After typing in the command, the user presses <RETURN>. If a user entry is made which is not appropriate or is incomplete, the system responds with "INVALID?=HELP" and will send "MODE:" again. A list of the basic commands, together with a list of various special keys, can be obtained by the user by entering <?> and pressing <RETURN>. A typical list is as follows:

```
MODE: ?
BASIC COMMANDS:
? = HELP
R = CURRENT REPORT
DEL = DELIVERIES
H = 30 DAY HISTORY
D = DATA DUMP (DEL & H)
L = LOGON MESSAGE
SPECIAL KEYS:
<CTRL-C> or <ESC> = ABORT CURRENT MODE
<CTRL-S> = PAUSE TRANSMISSION
<CTRL-Q> = RESUME TRANSMISSION
SILENT 700 KEYBOARDS: <DEL> = DELETE LINE
IBM COMPATIBLE KEYBOARDS: <BACKSPACE> = DELETE LINE
```

If the user makes a mistake in responding to the system prompts before pressing <RETURN>, he or she may use the appropriate delete line key to cancel the entry. If more characters are entered than the system can recognize, it will sound a beep at the user's terminal. When in the programming mode (FIG. 11) or one of the display modes, the user may enter a <CTRL-C> or <ESC> to exit and return to "MODE:". The <CTRL-C> is activated by holding down the "CTRL" key and typing "C".

The system provides a current report when in the R mode of operation. The R mode provides the current number of gallons of oil in the tank as well as other information. There are two parts to the R report, viz., an R mode information line and R mode status line. The display may look as follows:

MODE: R

| TIME | GALLONS | INCHES | USE | SPG | TNK-T |
|---|---|---|---|---|---|
| 4:27P | 4860 | 58.62 | 32 | 0.838 | 84 |

R Mode Information Line

The Current Report gives the current time according to the system clock, the amount of oil in the tank in gallons (GALLONS), the height of oil in the tank (INCHES), the amount of oil used since midnight (USE), the specific gravity of the oil (SPG), and the temperature of oil in the tank (TNK-T). Various special conditions may be denoted, for example, by the following symbols:

<42 Temperature less than 42 F or a break (open) in an electrical connection.

>>> Probable electrical short.

R Mode Status Line

Under normal conditions no other information than that shown above will appear in the R report. Under certain conditions, however, the following additional information may appear beneath the main data line:

INITCALC The Oil Tank Computer is performing the initial calculations. (This may only occur during initial startup, or following a system reset).
BELL_1_FAIL Air Bell Section 1 is bad or leaking.
BELL_2_FAIL Air Bell Section 2 is bad or leaking.
LOW_LEVEL The level of oil in the tank is below the Low Level Setpoint.
DELIVERY A delivery is currently in progress.
! If the system has been reset since midnight the entry will have an exclamation point following it.

An historical records or H mode provides a daily summary (from midnight to midnight) of the usage information shown on the Current Report. The daily summaries may go back for, e.g., 30 days. A sample of the printout or display is shown below. The most recent entry appears at the top left position in the printout. Up to 15 days usage may appear at the left set of columns. Days 16 to 30 may then be listed at the right set of columns.

MODE: H

| DATE | USE | LGAL | DATE | USE | LGAL |
|---|---|---|---|---|---|
| Mar 18 | 268 | 4700 | Mar 3 | 247 | 4502 |
| Mar 17 | 233 | 4968! | Mar 2 | 231 | 4733 |

The USE column and "!" character have the same meaning as described above. The LGAL column shows the lowest number of gallons in the tank for that day.

When in a delivery records (DEL) mode, the system provides a historical record of previous deliveries. The system will record the date, time, number of gallons, specific gravity (SPG), and temperature (DEL-T) of, for example, the last 40 oil deliveries. A sample of the printout is shown below. The most recent delivery is shown as the first item in the left column:

MODE: DEL

| DATE | TIME | DELIVERY | SPG | DEL-T |
|---|---|---|---|---|
| Mar 27 | 10:25P | 2500 | 0.903 | 120 |
| Mar 19 | 11:06P | 2000 | 0.903 | 126 |

Importantly, the system provides the specific gravity of the delivered oil, not a mix of the delivered oil with the oil initially contained in the tank. This is accomplished by using the computed values of specific gravity of tank oil just before and after a delivery, and the volume of oil in the tank before and after the delivery. The volume after the delivery (VT) times the total specific gravity (ST), is set equal to the sum of the products of the volume of oil delivered (VD) times specific density of the delivered oil (SD), and the volume of oil prior to the delivery (VP) times the specific density of oil prior to delivery (SP). From such relationship, the specific density of the oil delivered, SD, can be determined:

$$SD = \frac{(VT)(ST) - (VP)(SP)}{VD}$$

Also, the delivered temperature of the oil (DEL-T) corresponds to the temperature of the delivered oil as measured by the fill line sensor T1.

Liquid delivery volumes (e.g., gallons) are calculated as follows. An increase in sensed liquid pressure from one or both air bell sections greater than a preset $\Delta P$ triggers the delivery-in-progress flag referred to in FIG. 10. At the initial setting of this flag, the liquid volume or gallons in the tank just before the delivery began is stored ($G_{BD}$).

If a second increase is not seen after the initial increase, the delivery routine is aborted and the system returns to the main program. If a second increase occurs, the system continues to monitor the pressure until it stabilizes. Once the system stabilizes (Delivery Completed step in FIG. 10) it calculates the current liquid volume or gallons in the tank ($G_{AD}$) and the delivered gallons as:

$$\text{Gallons Delivered} = G_{AD} - G_{BD}$$

If the gallons delivered is greater than a required minimum (e.g., 50 gallons) then the delivery is logged and the program returns to the main routine.

Liquid consumption or usage is calculated as follows. Because of variations which can occur in pressure readings, it is preferable that usage be calculated directly from volume computations and only allowed to increase. The following equation is preferably used to determine daily usage as referred to in FIG. 10.

$$G_u = G_{LM} - G_L + G_A$$

where:
$G_u$ = gallons used, updated preferably every minute.
$G_{LM}$ = The lowest number of gallons in the tank since last delivery. Updated at midnight.
$G_L$ = The lowest number of gallons in the tank since the last delivery. Updated every time there is a delivery.
$G_A$ = The total number of gallons delivered on the current day. This is incremented for every delivery and cleared at midnight.

The usage routine is preferably bypassed if a drop in pressure greater than a given delta is sensed to minimize false usage calculations. This is the purpose of the USAGE? step in FIG. 10, and it serves as a stabilization feature.

A Data Dump or D mode of operation will enable the following to report to be printed or viewed:
1. Delivery Records
2. Historical Records The Data Dump mode thus provides a convenient way to ask the system to print out both reports without having to call them individually.

Figure 11:
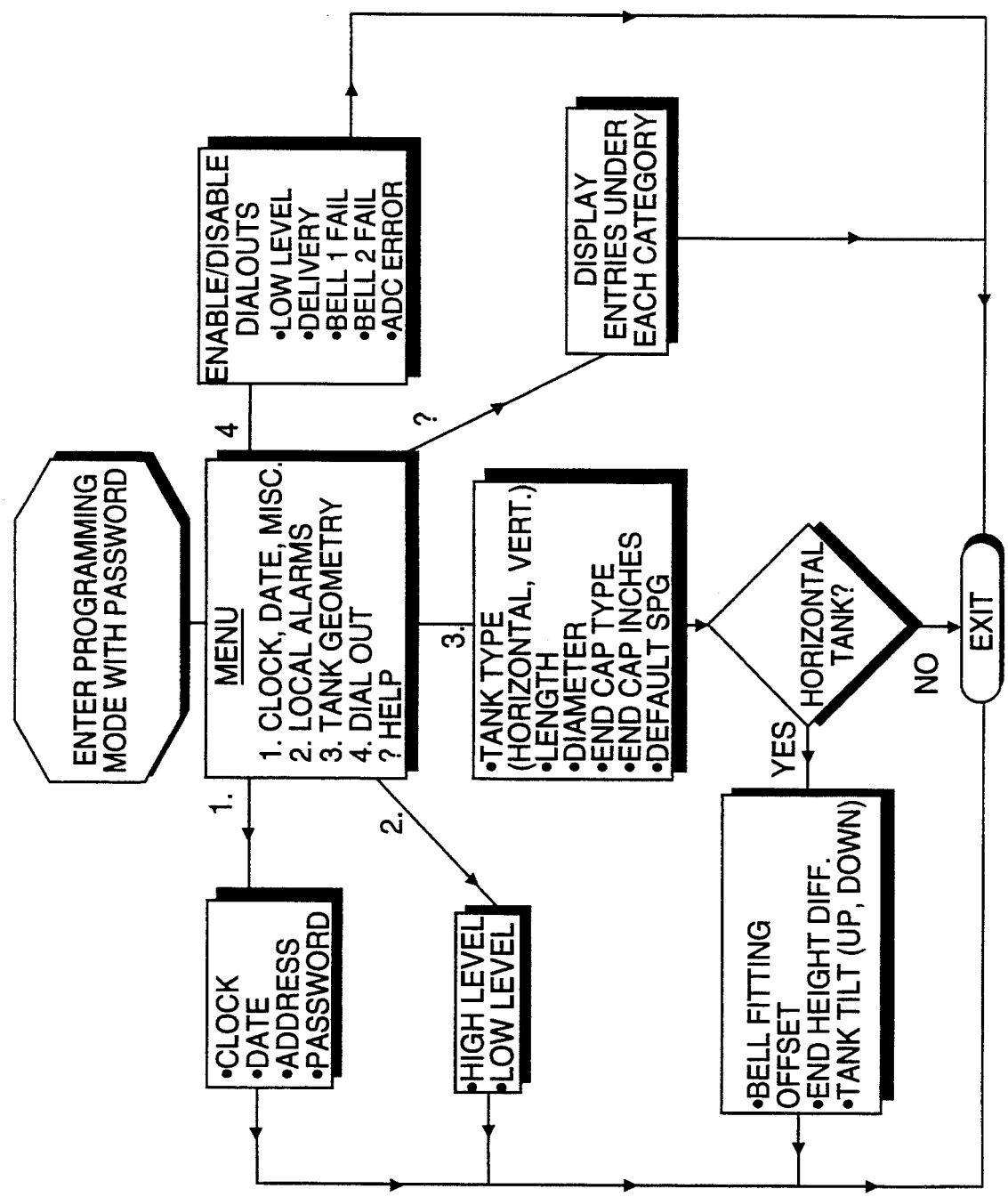

A programming or P mode of operation is obtained by entering <P><RETURN>. The system responds with "PASSWORD:" after which the user types his or her password and presses <RETURN>. Preferably, the user's password does not appear on the monitor screen while being entered. If the password is valid, the system responds by presenting a menu, such as the one shown below. If a wrong password is entered the system will respond with "INVALID" and then ask for the password again. If the second entry is not valid, the system will automatically hang up the phone line. Once a user successfully enters the programming mode the first time, he or she is not required to enter the password again if they wish to reenter the mode. If the user hangs up and redials, the password will be required before any programming will be allowed by the system. FIG. 11 shows the user options available once in the programming or P mode.

```
MODE: P
PASSWORD: ?
1. CLOCK, DATE, MISC.
2. LOCAL ALARMS
3. TANK GEOMETRY
4. DIALOUT
?. HELP
CHOICE:
```

A convenient procedure to view all available options in each submenu, is to enter <?> and press <RETURN>. The system then presents a display similar to the one below. Once a particular submenu is selected by entering its number after "CHOICE", the system prompts the user with each programmable option followed by a "?". On some of the prompts the current value may be shown in parenthesis. If the user wants to change the current value, he or she enters the new value followed up by <RETURN>. If the current value is to be maintained, the user simply presses <RETURN> and the system moves on to the next programmable option. Most programmable options have only one value. In those cases the system moves on to the next option after entry of a new value. For options that have multiple values, the system will not advance to the next option until the user enters a final <RETURN> to indicate no more new entries. A choice of options display may be as follows:

```
CHOICE: ?
1. CLOCK, DATE           3. TANK GEOMETRY
   CLOCK?                   TANK TYPE ?
   DATE?                    LENGTH FT. ?
   ADDRESS?                 DIAMETER FT. ?
   PASSWORD?                END CAP TYPE ?
                            RIGHT END CAP IN. ?
2. LOCAL ALARMS             LEFT END CAP IN. ?
                            DEFAULT SPG ?
```

-continued
```
HIGH LEVEL ALARM %
LOW LEVEL ALARM %
                         4. DIALOUT
                            DIALOUT ?
?. THIS LISTING             PHONE ?
CHOICE:
```

If an entry is made which is not appropriate or is incomplete, the system responds with "INVALID?-=HELP" and will redisplay the option label. If at any time the user wants to view a brief help message showing how to program the particular option being displayed, the user enters <?> and presses <RETURN>. Help messages may then give allowed values for the options, and show the proper format for making an entry.

If an entry error is made before pressing <RETURN>, the entry may be canceled using the <DELETE> key. If the user attempts to enter more characters than the system is expecting, a beep may be sounded. The command <CTRL-C> or <ESC> may be used to exit from the programming mode.

Submenu 1 (Clock, Date).

A system clock preferably is provided with a separate battery, in case a power failure occurs. The battery thus will maintain the system clock and date through extended power failures. All remaining programmable options are stored in a permanent memory that does not require battery backup.

The CLOCK and DATE? submenu enables entry of the current time and date which information is used in many places in the system. The time and date can be changed by entering a new time and date after their corresponding prompts. Preferably, the system adjusts automatically for daylight savings times and leap years. By using the "L" command to print out the logon message, the user can verify the programming of the desired clock and/or date.

The ADDRESS? prompt is used to enable entry of a building address of a length up to, for example, 24 characters. If a current address need to be changed, the new address can be entered after "ADDRESS?". Entry of the desired address can also be verified using the "L" command to display the logon message in which the building address is presented on line 1.

The PASSWORD? prompt enables the user to change his/her password. Preferably, there are two passwords that can be changed, a Phone password and a Keypad password. The Phone or Keypad password may be any combination of letters or numbers up to, e.g., 10 characters long. To change the password at the "PASSWORD?" prompt, the user types a "U." followed by the new password and <RETURN>. The Keypad password is used when entering the system programming mode via the keypad 14 on the display panel 12. The Keypad password may be only in the form of a number consisting of 8 digits. The password can be changed by typing "K." followed by the new password, and <RETURN>. Preferably, a third programmable password is provided for use by a service company to gain remote access to the system.

Submenu 2 (Local Alarms)

In the local alarms submenu, a HIGH LEVEL ALARM? prompt allows the user to set the point at which the high level alarm will be activated or sound, if the system has an external high level alarm. The entered number corresponds to a percentage of a full volume of the tank 48. The LOW LEVEL ALARM? prompt enables the user to set the point when a low level alarm will sound if the system is equipped with an external low level alarms, or that alarm at which the system will dial out to alert a remote user of a low level condition. The entered number corresponds to a percentage of the full volume of the tank 48.

Submenu 3 (Tank Geometry)

The tank geometry submenu allows the user to enter parameters that specify the geometry and tilt condition of the tank 48. The tank parameters should be programmed at system installation, and should not be changed unless the user understands precisely what each specified parameter represents. The display below shows each prompt that the system provides in the tank geometry setting mode. The values in parenthesis are default values and can be changed by entering desired new values after the prompts. The various tank parameters are also represented in FIG. 7 which was described above in connection with liquid fill and volume computations for tilted tanks.

---

TANK TYPE (HORIZONTAL=0, VERTICAL=1) (0)?__
LENGTH FT. ( 22.00)?__
DIAMETER FT. ( 6.00)?__
END CAP TYPE (0=NONE, 1=SPHERE, 2 ELLIPSE) (1)?__
END CAP IN. ( 12.00)?__
DEFAULT SPG ( .913)?__
BELL FITTING OFFSET FT. (6.25)?__
END HEIGHT DIFFERENCE IN. (3.00)?__
TANK TILT AT END CLOSER TO AIR BELLS (DOWN=0, UP=1)(1)?__
Submenu 4 (Dialout)

---

The DIALOUT submenu allows the user to turn on and off dial-out alarms in response to a DIALOUT? prompt. Five possible conditions for dial-out are, for example,
1. Low tank level;
2. Oil delivery;
3. Lower air bell section failure;
4. Upper air bell section failure; and
5. Analog to digital converter failure.

To enable or disable all possible dial-out conditions, the user enters a 'Y' or a 'N' next to the corresponding condition. To change the status of a particular condition, the user enters a number from 1 through 5 followed by a '.' followed by a 'Y' or a 'N' to enable or disable that condition.

Before displaying a "PHONE?" prompt, the system displays the dial-out telephone numbers currently in memory. To add or to change a stored number, a number 1 through 4 is entered followed by a "." and the desired telephone number. If a "1" is needed in the telephone number for long distance calls, it must be included. The telephone number can be from 7 to 11 digits long. The number should not begin with "0" or contain any dashes or spaces.

If the user wants to delete a telephone number and leave it blank, the of the line to be deleted is entered followed by a "." followed by a "X". The system commences a dialing out operation with telephone line number 1. If there are four telephone line numbers (1–4), the system will dial all four. If there are less than four numbers, the system dials all that are listed and stored. The system's own telephone number may be changed by entering "*" followed by a "." followed by the system's own telephone number. The number should include the area code and preferably be exactly 10 digits long, and not begin with either a "0" or a "1".

Another user command shown above is "L". The "L" command displays the logon message. There is also a "V" command for displaying the current version, date or revision level of the software embodied in the system. Other commands include "P1", "P2", "P3" and "P4", each for bypassing the submenus to allow the user to go directly into the corresponding submenu. For example, "P1" goes directly to "CLOCK". Casual users may, however, desire to use the "P" command to bring up the entire submenu listing.

When the system dials out to report an alarm condition, it will display an appropriate message on the remote terminal monitor. The form of message can include, e.g., the building address, time, date, and the alarm condition. A list of typical dial-out messages is shown below:

| | |
|---|---|
| 145 PALISADE STREET | 8:48A Fri Aug 14, 1992 Low Tank Level |
| 145 PALISADE STREET | 8:54A Fri Aug 14, 1992 P1 FAIL |
| 145 PALISADE STREET | 9:12A Fri Aug 14, 1992 P2 FAIL |
| 145 PALISADE STREET | 9:36A Fri Aug 14, 1992 ADC Error |
| 145 PALISADE STREET | 10:49A Fri Aug 13, 1992 DELIVERY 2100 GALS |

At the right-most column, the "Low Tank Level" and "Delivery 2100 gals" messages are self-explanatory. The "P1 FAIL" and "P2 FAIL" messages indicate that one of the air bell sections is inoperative. The "ADC Error" message indicates a hardware problem in the system.

The present system can be operated on site, as well as remotely, via the keypad 14 and display device 15 on the system housing front panel 12. Various displays that are shown on the display panel 15 and the system operation as controlled via the keypad 14, will now be discussed.

Under normal operation, the system alternately displays current time and date, and the number of gallons of liquid contained in the tank 48. Examples of such displays are as follows:

| GALLONS: | 4020 | (alternating with) |
|---|---|---|
| 10:44A | 12-25-93 | |

Other than the above normal alternating displays, the system can afford other display modes to allow an on site user to access additional information. The display modes are accessed by a certain key combination from the keypad 14 having touch-actuated keys with numerals and various indicia on the key tops as shown more clearly in FIG. 7. To change the normal display operation, a key labeled MODE is operated first. After pressing the key, the display panel 15 will display "MODE?". If no other key is operated within, e.g., 5 seconds the display reverts to the normal operating mode. The next key that is operated after the MODE key represents the kind of display desired to be seen. The following choices can be made with the present system:

| KEY | FUNCTION | EXAMPLE |
|---|---|---|
| 7/DELIVERY | DISPLAY THE LAST RECORDED DELIVERY. | 3500 DEL |
| 8/INCHES | DISPLAY THE HEIGHT OF OIL IN THE TANK. | 39.5 INCHES |
| 9/USAGE USED | DISPLAY THE AMOUNT OF OIL USED SINCE LAST MIDNIGHT. | 350 GAL |
| 4/TEMP | DISPLAY THE CURRENT TANK TEMPERATURE | 95 DEG F |
| 5/SPG | DISPLAY THE CURRENT SPECIFIC GRAVITY OF THE OIL. | .913 SpG |
| 6/TEST | PERFORM SELF TEST | |
| 2/SETUP | PERFORM UNIT PROGRAMMING | |

Key 6/TEST initiates a self-test mode in which the system operates to find certain system errors. The system tests for, e.g., three conditions, viz., (1) air leaks in lower air bell section 64, (2) air leaks in upper air bell section 66, and (3) the sampling order of the two air bell sections. When entering the self-test mode, the display panel 15 shows "Testing Bell 1 . . . ". After a certain viewing time (e.g., 20 seconds), the display panel 15 changes to show "Testing Bell 2 . . . .". After another time lapse, the display indicates a system report. If all the mentioned three conditions are acceptable (pass), the displayed report appears as follows:

B1=P B2=P ORD=P

If a letter "F" appears after any equal sign, there is an error associated with that condition.

As mentioned, setup parameters can be programmed in the system from keypad 14 as well as via the telephone interface. In the present system, not all options that are programmable via telephone are programmable from the keypad 14. When in the keypad setup mode, there are three submenus; (1) TANK GEOMETRY, (2) TIME & DATE and (3) SETPOINTS. Each of these keypad related submenus will be discussed in detail shortly.

The setup for programming mode is initiated via the keypad 14 by first operating the MODE key followed by the 2/SETUP key. A blinking cursor on the display panel 15 signifies that the system is waiting for an entry. A default response is preferably shown first followed by the cursor. A given item can be changed by pressing the <BACKSPACE> key on keypad 14 to delete the default response, and a new value can then be entered via the key pad. Once displayed, the new value can be entered by pressing ENTER key. In some cases the system may seek a Yes/No response. In such case, either the 1/YES or 0/NO keys serve to answer these inquiries. The setup may be exited by pressing the ESC or MODE keys on keypad 14. Another special function key on keypad 14 is the AM/PM key which is used during a time & date portion of the setup mode, discussed below.

The on site user is first prompted to enter a password when in the setup mode. As with the remote terminal operation, it is preferred that the password not be displayed when entered; however, an asterisk (*) may be displayed for every digit entered. Once the password is typed on the keypad 14, the user presses the ENTER key. If the entered password is invalid, the display panel 15 shows "INVALID!!!", and the system reverts to the normal operating mode. If the entered password is correct, the display panel 15 shows the first sub-item prompt relating to tank geometry, as follows:

TANK GEOMETRY!_

To enter the TANK GEOMETRY data input mode the user presses the 1/YES key. If he or she wants to proceed to a next submenu (Time & Date), the 0/NO key is operated. In the TANK GEOMETRY routine, the first prompt calls for the type of tank. In most cases that would be answered with a "0" for a horizontal tank:

Vrt=1, Horiz=0:0_

The next eight parameters relate to actual tank dimensions. They are used for calculating the volume of oil or other liquid contained in the tank. The tank geometry parameters are critical and therefore should be entered only during installation or servicing by qualified persons:

Lnth Ft:(19.1)_
Diam Ft:(8.14)_
NO=0, SP=1, EL=2:1_
Cap In:(10.00)_
Def SPG:(0.8590)_
BFO Ft:(6.000)_
EHD IN:(2.40)_
Tilt (DN=0, UP=1):0_

In the above example, three basic types of tanks are recognized, viz., flat (NO), spherical (SP), and elliptical (EL). A spherical tank is entered in the above example.

The second submenu in the setup mode is for Time & Date. The submenu is obtained by pressing the 0/NO key when prompted by the prompt for the TANK GEOMETRY. After pressing the key, the display panel 15 will show the following:

TIME & DATE!_

To continue with the TIME & DATE submenu, the user presses the 1/YES key. When in the TIME & DATE routine, the user is prompted for changes in the TIME & DATE. The first item the user may change is the time, first in hours and then minutes, in a conventional manner. Using the DEL key and the number keys the user can change or enter the correct time. A sample prompt is as follows:

Time:08:00A

A cursor first appears beneath the colon and the user can enter any changes to the hour, followed by pressing the ENTER key. The cursor then moves beneath the A (or a P) and the user is allowed to edit the minutes portion of the time. After editing the minutes, the user presses the ENTER key and the time is entered. While entering either the hours or minutes portion of the time, pressing the AM/PM key will toggle the AM/PM display between an A and P.

After entering the time, the date is displayed in a similar manner except there are three prompts, viz., the month, day and year. The items are prompted as shown below:

DATE: 12-25-1993
12-25_-1993

The third submenu in the setup mode, is Setpoints. The submenu is obtained after entering NO after the first two submenu displays. The following prompt is then displayed:

Setpoints?_

To enter the Setpoints submenu the user presses 1/YES. If the user presses the 0/NO, the system will resume normal operation. In the Setpoints submenu, the user is prompted for four items. The first two, shown below, are percentages of full volume at which the high and low level alarms will be triggered:

High LVL:90_

Low LVL:10_

The next two items allow the user an opportunity to turn on and off some of the dial out options. As mentioned earlier, when operating the system on site via the keypad 14 and display panel 15, the user is allowed to turn on or off the low level and delivery dial out options. After each of the two following displays, the user presses either the 1/YES or 0/NO keys to have the display show either YES or NO. The user then presses ENTER to set the desired condition of the dial out alarm.

L LVL DO:NO_

DEL DO:NO_

While the foregoing description represents a preferred embodiment of the invention, it will be obvious to those skilled in the art that various changes and modifications may be made, without departing from the true spirit and scope of the invention as pointed out in the following claims.

What we claim is:

1. A tank liquid monitoring system, comprising:
air bell means arranged to be located inside a tank, for producing an output signal corresponding to a liquid pressure at a certain location in the tank;
processor means coupled to an output of said air bell means, said processor means including:
delivery-in-progress sensing means for sensing an initial increase in the liquid pressure greater than a preset pressure difference and for providing a corresponding delivery indication,
means for determining an initial volumetric measure of liquid in said tank at about a time when said delivery-in-progress sensing means provides said delivery indication,
delivery complete sensing means for providing a delivery complete indication in the absence of further increases in said liquid pressure following said initial increase,
means for determining a final volumetric measure of liquid in said tank at about a time when said delivery complete sensing means provides said delivery complete indication; and
means for determining a volumetric measure of liquid delivered to said tank, including means for calculating a difference between said final and said initial volumetric measures of liquid in said tank, and means for producing a signal indicative of the volumetric measure of liquid delivered to said tank in accordance with the calculated difference.

2. A tank liquid monitoring system according to claim 1, wherein said processor means includes logging means for storing information relating to a number of deliveries of liquid to said tank.

3. The tank liquid monitoring system of claim 2, wherein said logging means includes means for storing a volumetric measure of liquid delivered to said tank for each of said numbers of deliveries.

4. The tank liquid monitoring system of claim 3, wherein said logging means includes means for storing a date and a time in association with each of said numbers of deliveries.

5. The tank liquid monitoring system of claim 3, comprising first liquid temperature sensing means in proximity with a fill line of said tank for producing a signal corresponding to a temperature of a liquid delivered via said fill line to the tank, and said logging means includes means for storing a liquid temperature in association with each of said numbers of deliveries.

6. The tank liquid monitoring system of claim 3, wherein said processor means includes means for calculating a delivered specific gravity of a liquid when the liquid is delivered to said tank, and said logging means includes means for storing a specific gravity in association with each of said numbers of deliveries.

7. The tank liquid monitoring system of claim 1, including modem means coupled to said processor means for enabling communication of data and operating commands between said processor means and a remote location by way of an outside telephone line.

8. A tank liquid monitoring system according to claim 1, comprising:
memory means for storing tank information corresponding to dimensions and geometry of said tank, wherein the tank has an axis and end caps at opposite axial ends of the tank;
input means for enabling a user to enter said tank information into said memory means;
said processor means including means responsive to said tank information entered by the user into said memory means for (a) calculating a height of liquid in said tank at each of said end caps, (b) determining two liquid volumes, each based on a calculated height of the liquid in said tank at a different one of the end caps, and (c) averaging the two determined liquid volumes with one another to produce an output corresponding to an actual volume of liquid in said tank.

9. A system according to claim 8, including a housing for containing said processor means, said input means and said memory means, said input means comprising keypad means on said housing for enabling a user to enter data and operating commands to said processor means, and display means on said housing for enabling the user to read a data output corresponding at least to a liquid volume determination by said processor means.

10. A system according to claim 8, wherein said input means is operative to enter into said memory means information corresponding to a tilt of the axis of said tank with respect to the horizontal.

11. A system according to claim 10, wherein said input means is operative to enter into said memory means information corresponding to tank end caps that are spherical.

12. A system according to claim 10, wherein said input means is operative to enter into said memory means information corresponding to tank end caps that are elliptical.

13. A system according to claim 10, wherein said input means is operative to enter into said memory means information corresponding to tank end caps that are flat.

14. A system according to claim 1, including air line means connected between said processor means and said air bell means for communicating said liquid pressure to said processor means.

15. A system according to claim 14, wherein said air line means comprises a single length of tubing.

16. A system according to claim 15, wherein said air bell means comprises two air bell sections joined end to end to one another along a common axial direction, and said air line means comprises two lengths of tubing each communicating with a different one of said air bell sections.

17. A system according to claim 1, including modem means coupled to said processor means for enabling communication of data and operating commands between said processor means and a remote location by way of an outside telephone line.

18. A method of monitoring quantities of liquid delivered to a tank, comprising:
locating air bell means inside a tank, whereby the air bell means produces an output signal corresponding to a liquid pressure at a certain location in the tank;
sensing the output signal for an initial increase in the liquid pressure greater than a preset pressure difference, thereby providing a corresponding delivery indication,
determining an initial volumetric measure of liquid in said tank at about a time when said delivery indication is provided,
providing a delivery complete indication in the absence of further increases in said liquid pressure following said initial increase,
determining a final volumetric measure of liquid in said tank at about a time when said delivery complete indication is provided; and
determining a volumetric measure of liquid delivered to said tank, by calculating a difference between said final and said initial volumetric measures of liquid in said tank, and producing a signal indicative of a measure of liquid delivered to said tank in accordance with the calculated difference.

19. The method of claim 18, including storing in logging means information relating to a number of deliveries of liquid to said tank.

20. The method of claim 19, including storing in the logging means a volumetric measure of liquid delivered to said tank for each of said numbers of deliveries.

21. The method of claim 20, including storing in said logging means a date and a time in association with each of said numbers of deliveries.

22. The method of claim 20, comprising placing first temperature sensing means in proximity with a fill line of said tank, producing a signal corresponding to a temperature of a liquid delivered via said fill line to the tank, and storing in said logging means a liquid temperature in association with each of said numbers of deliveries.

23. The method of claim 20, including calculating a delivered specific gravity of a liquid when the liquid is delivered to said tank, and storing in said logging means a specific gravity in association with each of said numbers of deliveries.

24. The method of claim 18, including coupling modem means to said processor means, thereby enabling communication of data and operating commands between said processor means and a remote location by way of an outside telephone line.

25. The method of claim 18, comprising the steps of:
storing tank information corresponding to dimensions and geometry of said tank, the tank having an axis and end caps at opposite axial ends of the tank;
determining the quantities of liquid in the tank based on the signal from the air bell means and the tank information, by (a) calculating a height of liquid in said tank at each of said end caps, (b) determining two liquid volumes, each based on a calculated height of liquid in said tank at a different one of the end caps, and (c) averaging the two determined liquid volumes with one another to produce an output corresponding to an actual volume of liquid in said tank.

26. The method of claim 25, including storing tank information corresponding to a tilt of the axis of said tank with respect to the horizontal.

27. The method of claim 26, including storing tank information corresponding to tank end caps that are spherical.

28. The method of claim 26, including storing tank information corresponding to tank end caps that are elliptical.

29. The method of claim 26, including storing tank information corresponding to tank end caps that are flat.

30. The method of claim 25, including communicating information and operating commands between a site where the tank is located and a remote location by way of a telephone line.

* * * * *